United States Patent
Ikeuchi et al.

(10) Patent No.: US 8,943,358 B2
(45) Date of Patent: Jan. 27, 2015

(54) STORAGE SYSTEM, APPARATUS, AND METHOD FOR FAILURE RECOVERY DURING UNSUCCESSFUL REBUILD PROCESS

(75) Inventors: Kazuhiko Ikeuchi, Kawasaki (JP); Hidejirou Daikokuya, Kawasaki (JP); Chikashi Maeda, Kawasaki (JP); Norihide Kubota, Kawasaki (JP); Atsushi Igashira, Yokohama (JP); Kenji Kobayashi, Kawasaki (JP); Ryota Tsukahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 234 days.

(21) Appl. No.: 13/569,436

(22) Filed: Aug. 8, 2012

(65) Prior Publication Data
US 2013/0047029 A1    Feb. 21, 2013

(30) Foreign Application Priority Data

Aug. 17, 2011    (JP) .................................. 2011-178466

(51) Int. Cl.
*G06F 11/00*    (2006.01)
*G06F 11/14*    (2006.01)
*G06F 11/10*    (2006.01)

(52) U.S. Cl.
CPC ................ *G06F 11/14* (2013.01); *G06F 11/00* (2013.01); *G06F 2211/1059* (2013.01); *G06F 2211/1061* (2013.01); *G06F 11/1092* (2013.01)
USPC ...................................................... 714/6.22

(58) Field of Classification Search
CPC .............. G06F 3/0689; G06F 11/1076; G06F 11/1084; G06F 11/1092; G06F 11/1438; G06F 11/1441; G06F 11/2071; G06F 11/2089; G06F 11/2094; G06F 2211/1057
USPC ........ 714/6.1, 6.2, 6.21, 6.22, 6.23, 6.24, 6.3, 714/6.31, 6.32; 711/114
See application file for complete search history.

(56) References Cited

U.S. PATENT DOCUMENTS

| | | | |
|---|---|---|---|
| 6,397,347 B1 * | 5/2002 | Masuyama et al. ............ | 714/5.1 |
| 7,185,222 B2 * | 2/2007 | Burton et al. ................ | 714/5.11 |
| 7,444,541 B2 | 10/2008 | Lubbers et al. | |
| 7,925,918 B2 * | 4/2011 | Settle et al. ................. | 714/6.12 |
| 2006/0224827 A1 * | 10/2006 | Hirofuji et al. ............... | 711/114 |

FOREIGN PATENT DOCUMENTS

| | | |
|---|---|---|
| JP | 2002-108571 A | 4/2002 |
| JP | 2004-206239 A | 7/2004 |
| JP | 2010-140493 A | 6/2010 |

* cited by examiner

*Primary Examiner* — Scott Baderman
*Assistant Examiner* — Joseph Kudirka
(74) *Attorney, Agent, or Firm* — Fujitsu Patent Center

(57) ABSTRACT

A storage control apparatus manages a plurality of storage devices which belong to a RAID Logical Unit (RLU) such that data is made redundant between different storage devices, where RAID stands for Redundant Arrays of Independent Disks. If a first storage device fails, a rebuild controller executes a rebuild process to store the same data as recorded in the first storage device in a spare storage device. When the rebuild controller executing the rebuild process has failed in reading out data from a second storage device, a data recovery controller restarts the first storage device, and reads out data to be stored in the spare storage device from the restarted first storage device.

14 Claims, 26 Drawing Sheets

270 NON-REDUNDANT WRITE MANAGEMENT TABLE

| LOGICAL UNIT NUMBER | LOGICAL ADDRESS |
|---|---|
| LUN#00 | LBA#xx |
| LUN#00 | LBA#yy |
| ⋮ | ⋮ |

FIG. 7

<PREPROCESSING OF SALVAGING METHOD (1)>
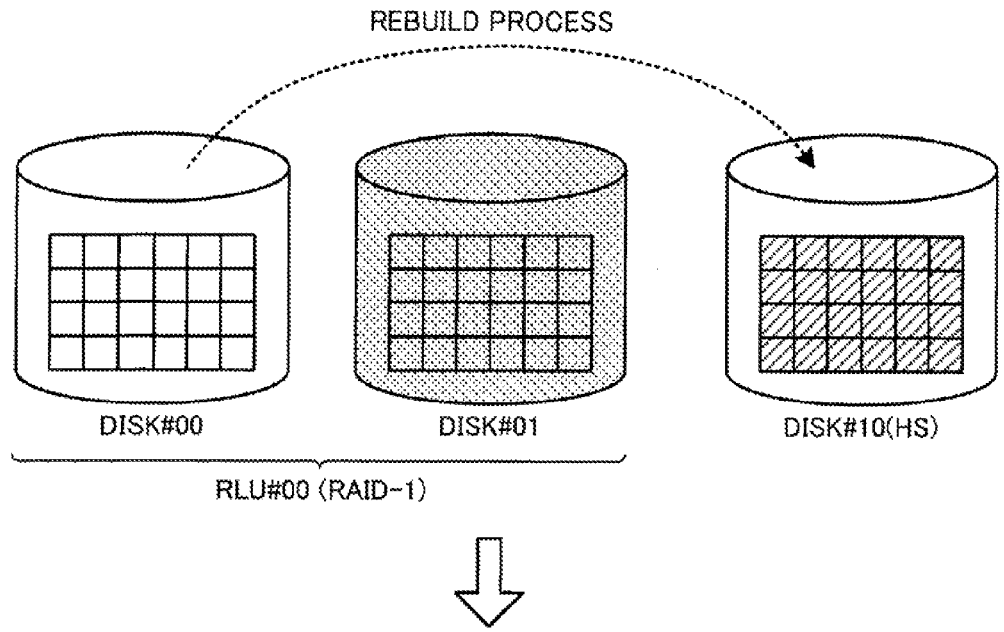
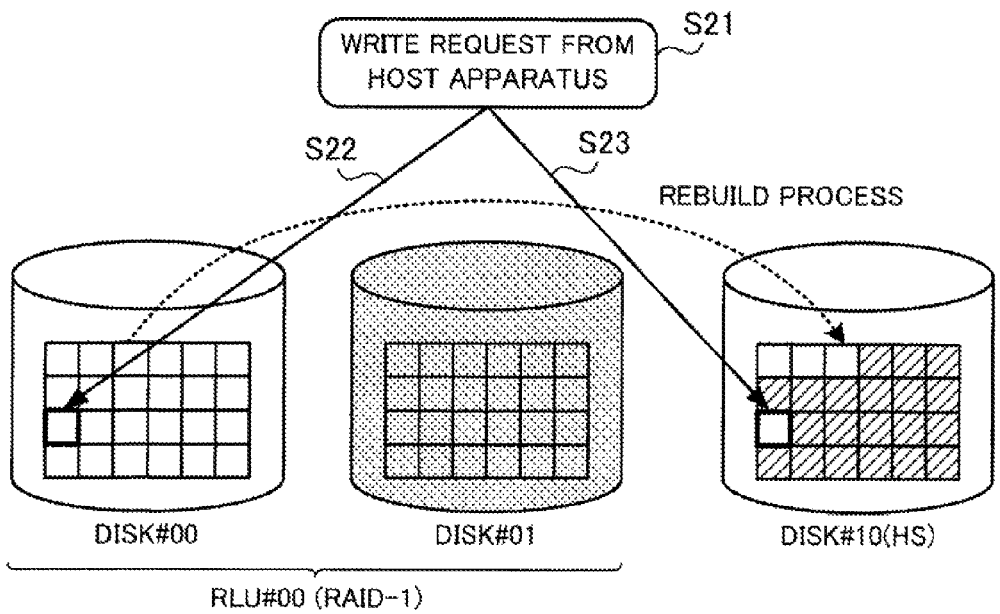
FIG. 11

STORAGE SYSTEM, APPARATUS, AND METHOD FOR FAILURE RECOVERY DURING UNSUCCESSFUL REBUILD PROCESS

CROSS-REFERENCE TO RELATED APPLICATION

This application is based upon and claims the benefit of priority of the prior Japanese Patent Application No. 2011-178466, filed on Aug. 17, 2011, the entire contents of which are incorporated herein by reference.

FIELD

The embodiments discussed herein are related to a storage system, a storage control apparatus, and a storage control method.

BACKGROUND

In recent years, there has been widely used a storage system using a plurality of storage devices, such as HDDs (Hard Disk Drives). Many of such storage systems have redundant controllers for controlling access to the storage devices in order to improve reliability of data access to the storage devices. For example, there has been proposed a storage system configured such that if both of duplexed controllers are stopped due to a hardware error, the hardware is recovered from the error having temporarily occurred by executing processing for powering off and on the both systems.

Further, in the storage systems, in general, record control in which data is redundantly stored in two or more storage devices is performed using a RAID (Redundant Arrays of Independent Disks) technique, whereby the safety of recorded data is improved.

Furthermore, in the storage systems which redundantly control data, if one of storage devices suffers from a failure, data stored in the faulty storage device is rebuilt, and is stored in another storage device. This process is generally referred to as "the rebuild process". By executing the rebuild process, redundancy of the data is recovered.

Many of storage systems have a spare storage device provided therein, referred to as the "hot spare", and often execute the rebuild process using the hot spare. On the other hand, there are also other storage systems that do not use a hot spare, but execute the rebuild process for a new storage device when a faulty storage device is replaced by the new storage device. For example, there has been proposed a storage system configured such that when an error has occurred in one of storage devices managed by RAID 5, parity is rebuilt for a storage device having replaced the faulty storage device, by copying data not from a storage device within the same parity group, but from a storage device at the same location in the mirror configuration for snap shot.

See, for example, Japanese Laid-Open Patent Publication No. 2004-206239 and Japanese Laid-Open Patent Publication No. 2002-108571.

By the way, in a storage system, if one of storage devices suffers from a failure in a state in which data has been duplexed, such as a state managed by RAID 5, the rebuild process is executed in a state in which the redundancy of the data is lost. During the rebuild process in the state in which the redundancy of the data is lost as mentioned above, there can further occur a failure in reading out data from still another storage device. This readout failure may be caused e.g. by a partial defect on the surface of a disk medium. If the readout of data from the still other storage device fails in the state in which the redundancy of the data is lost, the data is lost.

SUMMARY

According to an aspect of the invention, there is provided a storage system including a plurality of storage devices, a storage control apparatus configured to control recording of data in the plurality of storage devices such that data recorded in the plurality of storage devices is made redundant between different storage devices, and a spare storage device configured to be used in place of any of the plurality of storage devices, wherein the storage control apparatus executes, when a first storage device in the plurality of storage devices fails, a rebuild process to store the same data as data recorded in the first storage device in the spare storage device, and reads out, when reading of data from a second storage device in the plurality of storage devices is unsuccessful in the rebuild process, data to be stored in the spare storage device from the first storage device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of information registered in a non-redundant write management table;

FIG. 11 illustrates preprocessing for execution of a salvaging method (1);

DESCRIPTION OF EMBODIMENTS

Figure 1:
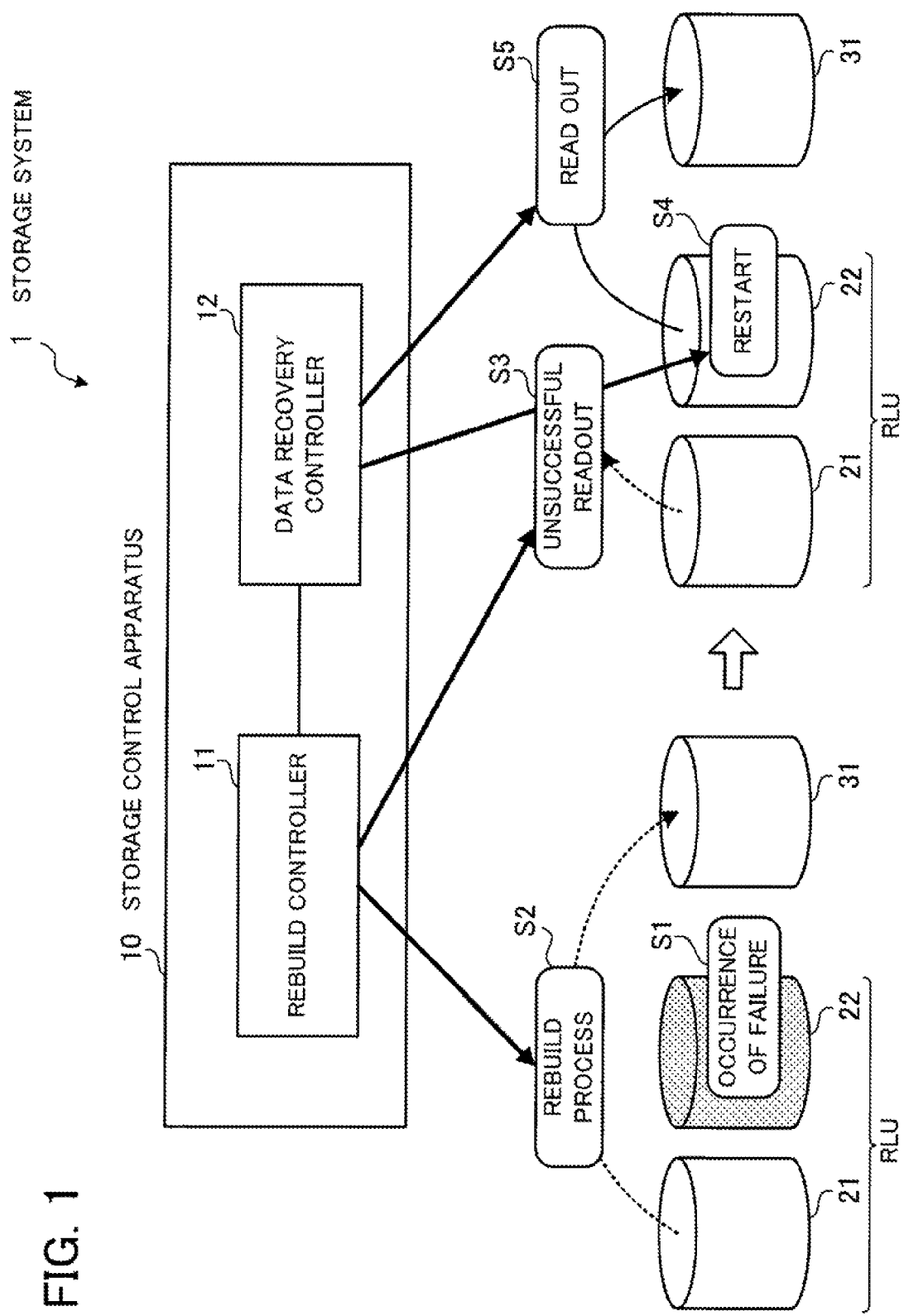
FIG. 1 illustrates an example of the configuration of a storage system according to a first embodiment.

Several embodiments will be described below with reference to the accompanying drawings, wherein like reference numerals refer to like elements throughout.

(a) First Embodiment

FIG. 1 illustrates an example of the configuration of a storage system according to a first embodiment.

The storage system, denoted by reference numeral 1, includes a storage control apparatus 10 and a plurality of storage devices. The storage devices included in the storage system 1 are nonvolatile storage devices, such as HDDs and SSDs (Solid State Drives). FIG. 1 illustrates the storage devices, denoted by reference numeral 21, 22, and 31, as examples of the storage devices included in the storage system 1.

The storage control apparatus 10 controls access to the storage devices of the storage system 1 according to a request from a host apparatus, not illustrated. Further, the storage control apparatus 10 controls the access processing to the storage devices of which storage areas form logical storage areas, on a logical storage area-by-logical storage area basis. Hereinafter, each logical storage area formed as above is referred to as an RLU (RAID Logical Unit). In FIG. 1, the respective storage areas of the storage devices 21 and 22 belong to one RLU, by way of example.

The storage control apparatus 10 controls a plurality of storage devices which belong to an RLU such that data recorded in the RLU is made redundant between respective storage areas of different storage devices. By controlling the data as above, even when one of the storage devices which belong to the RLU fails, the data recorded in the RLU is prevented from being lost. Methods used for the RLU management include RAID 1, RAID 4, and RAID 5.

Further, the storage system 1 has a spare storage device made ready beforehand for being used in place of any of the storage devices which belong to the RLU. In FIG. 1, it is assumed that the storage device 31 is a spare storage device, by way of example.

The storage control apparatus 10 includes a rebuild controller 11 and a data recovery controller 12. Processes executed by the rebuild controller 11 and the data recovery controller 12 are realized e.g. through executing predetermined programs by a CPU (Central Processing Unit) included in the storage control apparatus 10.

If one of the storage devices (the storage device 22 in the present example) which belong to the RLU fails (step S1), the rebuild controller 11 executes "the rebuild process" for storing the same data as recorded in the faulty storage device 22, in the spare storage device 31 (step S2).

When the RLU is managed by RAID 1, the rebuild controller 11 copies the RLU data read from the other storage device 21 which belongs to the RLU into the spare storage device 31. Further, when the RLU is managed by RAID 4 or RAID 5 (in this case, the RLU is formed by three or more storage devices), the rebuild controller 11 reads out data from all of the storage devices belonging to the RLU which are not faulty, calculates data recorded in the faulty storage device based on the read data, and stores the calculated data in the spare storage device.

If the rebuild controller 11 has failed in reading data during the rebuild process (step S3), the data recovery controller 12 executes processing for salvaging (recovering) the data to be stored in the spare storage device 31. FIG. 1 illustrates a case where the rebuild controller 11 has failed in reading the data from the storage device 21 during the rebuild process.

The data recovery controller 12 attempts to read the data from the faulty storage device 22. For example, the data recovery controller 12 restarts the faulty storage device 22 (step S4), and reads out the data to be stored in the spare storage device 31, which corresponds to the data which was not successfully read by the rebuild controller 11 (step S5). Note that "to restart the faulty storage device 22" in the step S4 means processing for resetting the faulty storage device 22 by powering off and on the storage device 22. For example, when the storage device 22 is powered off after the failure of the storage device 22 has occurred (step S1), the storage device 22 is powered on again in the step S4. On the other hand, when the power of the storage device 22 remains on after the failure has occurred (step S1), the data recovery controller 12 executes reading of the data from the storage device 22 before restarting the storage device 22, for example, and if the reading of the data is unsuccessful, the data recovery controller 12 may restart the storage device 22 and execute reading of the data from the restarted storage device 22 again.

If reading of the data from the storage device 22 is successful (i.e. if the data has been successfully salvaged), the data recovery controller 12 stores the read data in the spare storage device 31.

Even when data has not been successfully read out during the rebuild process, by executing the above-described salvage process, there is created the possibility of recovery of the data to be stored in the spare storage device 31, corresponding to the data which has not been successfully read out. Therefore, it is possible to reduce the possibility of occurrence of data loss.

Note that even after a failure has occurred in the storage device 22 which belongs to the RLU, the storage control apparatus 10 is capable of continuing the access processing to the RLU in response to a request from the host apparatus using the storage device 21 as the remaining storage device which belongs to the RLU. In the above-described salvage process executed by the data recovery controller 12, the faulty storage device 21, which is not being used for the access processing executed in response to a request from the host apparatus, is restarted. Therefore, the salvage process has little influence on the access processing executed in response to a request from the host apparatus, which makes it possible to prevent the speed of response to the host apparatus from being largely reduced.

(b) Second Embodiment

Figure 2:
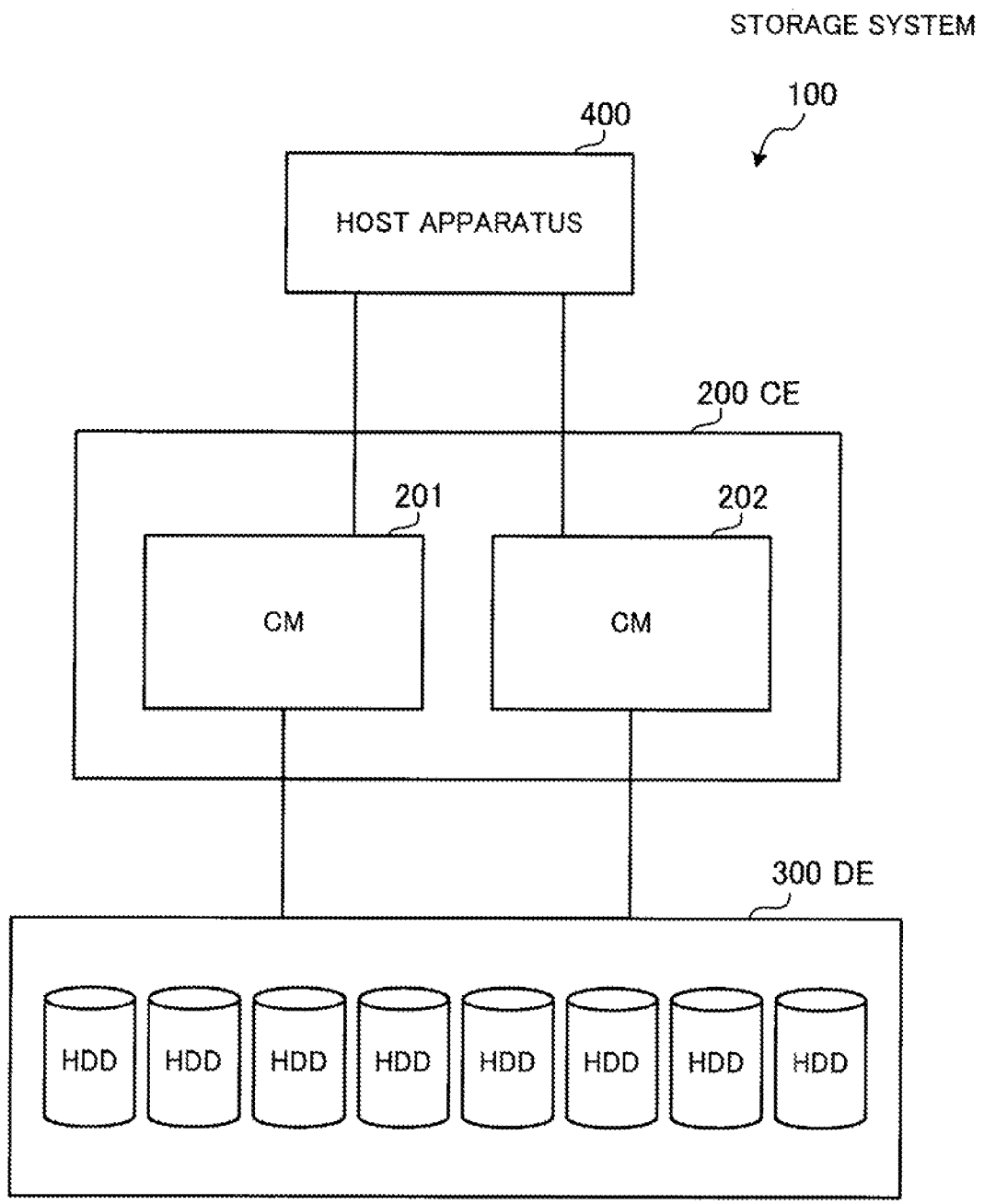
FIG. 2 illustrates an example of the entire configuration of a storage system according to a second embodiment.

FIG. 2 illustrates an example of the entire configuration of a storage system according to a second embodiment.

The storage system illustrated in FIG. 2, denoted by reference numeral 100, includes a CE (Controller Enclosure) 200 and a DE (Drive Enclosure) 300. Further, a host apparatus 400 is connected to the CE 200.

The CE 200 contains CMs (Controller Modules) 201 and 202. The CMs 201 and 202 each perform reading and writing of data from and into storage devices within the DE 300 in response to an I/O (In/Out) request from the host apparatus 400. The CMs 201 and 202 manage physical storage areas realized by the storage devices within the DE 300 by RAID, and controls access to these physical storage areas.

The CMs 201 and 202 may be connected to each other e.g. via a router. Further, the CE 200 may be provided with only one CM, or three or more CMs. However, by providing the CMs in plurality, an access control system with respect to the DE 300 is made redundant, which improves reliability of access control processing.

The DE 300 is provided with a plurality of storage devices each of which is under access control by the CMs 201 and 202. In the present embodiment, the DE 300 is a disk array device provided with HDDs as storage devices. Note that as the storage devices contained in the DE 300, it is possible to use other types of nonvolatile storage devices, such as SSDs. Further, a plurality of DEs 300 may be connected to the CE 200.

The host apparatus 400 requests the CMs 201 and 202 to access the HDDs in the DE 300 according to a user's operation. The host apparatus 400 is capable of reading out data from the HDDs in the DE 300 and writing data into the HDDs in the DE 300 via one of the CMs 201 and 202 e.g. according to a user's operation.

Note that the CMs 201 and 202 in the CE 200 each have the same configuration, and is capable of executing the same processing. Therefore, only the CM 201 will be described hereinafter, and description of the CM 202 is omitted.

Figure 3:
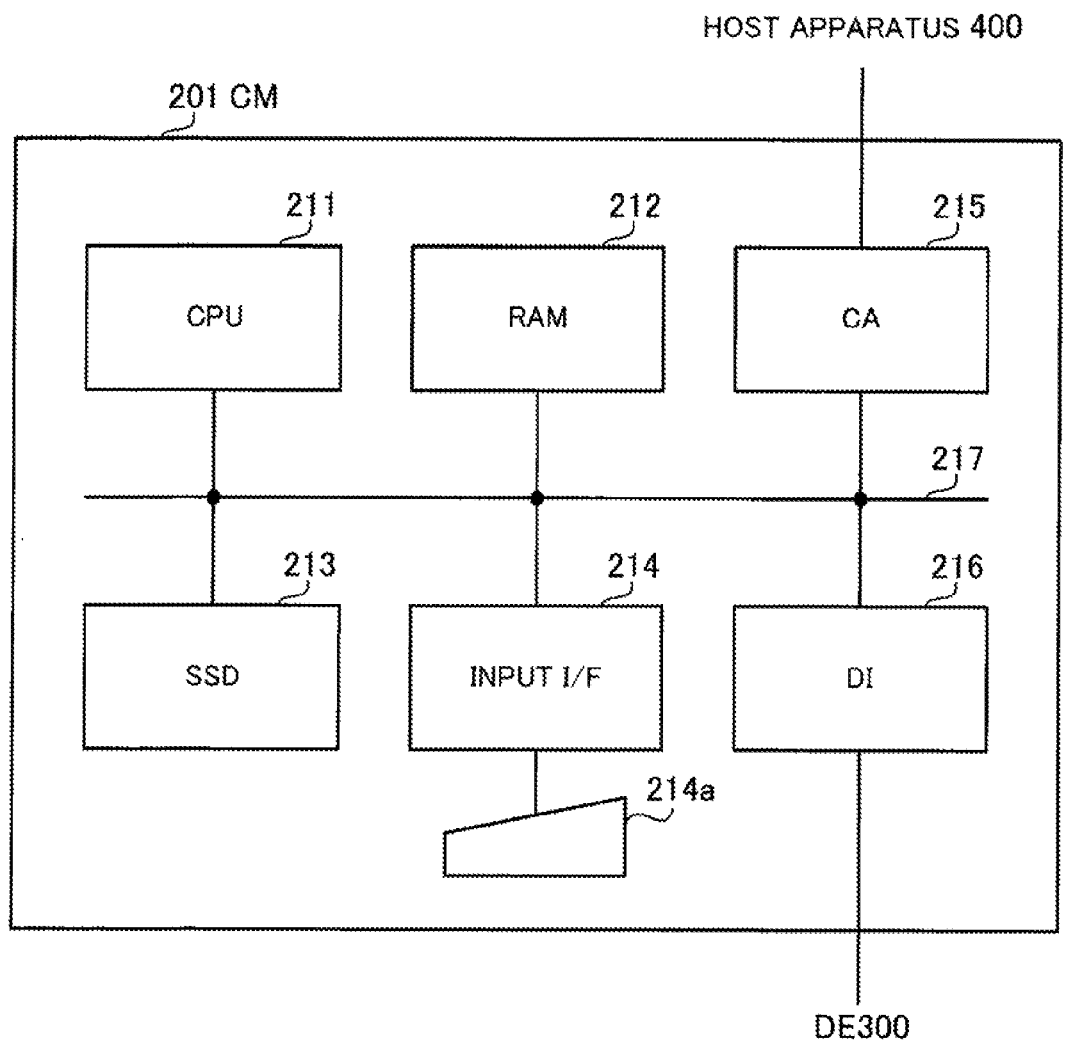
FIG. 3 illustrates an example of the hardware configuration of a CM.

FIG. 3 illustrates an example of the hardware configuration of the CM.

The overall operation of the CM 201 is controlled by a CPU 211. A RAM (Random Access Memory) 212 and a plurality of peripheral devices are connected to the CPU 211 via a bus 217. The RAM 212 is used as a main storage device for the CM 201, and temporarily stores part of programs being executed by the CPU 211 and various data for use in processing by the programs.

An SSD 213, an input interface 214, a CA (Channel Adapter) 215, and a DI (Drive Interface) 216, as examples of the peripheral devices, are connected to the CPU 211.

The SSD 213 is used as a secondary storage device for the CM 201, and stores programs executed by the CPU 211 and various data for execution of the programs. Note that another type of nonvolatile storage device, such as a HDD, may be used as the secondary storage device.

An input device 214a including operation keys is connected to the input interface 214. The input interface 214 outputs a signal indicative of an operation input to the input device 214a to the CPU 211.

The CA 215 executes interface processing for transmitting and receiving data between the host apparatus 400 and the CM 201. The CA 215 and the host apparatus 400 communicates with each other e.g. according to the FC (Fibre Channel) standard.

The DI 216 executes interface processing for transmitting and receiving data between the DE 300 and the CM 201. The DI 216 and the DE 300 communicates with each other e.g. according to the SAS (Serial Attached SCSI, SCSI: Small Computer System Interface) standard.

Figure 4:
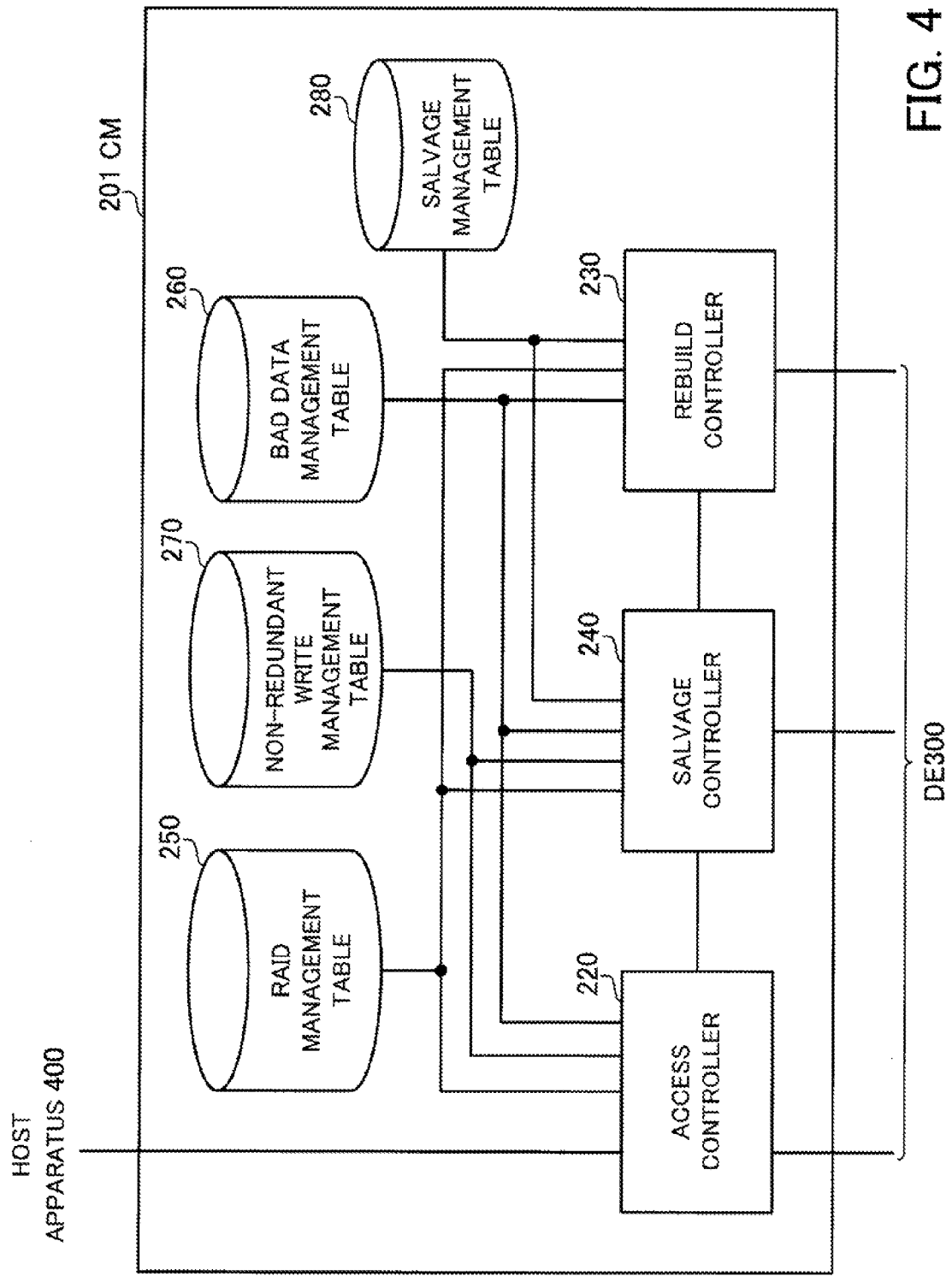
FIG. 4 is a block diagram of an example of the configuration of processing functions of the CM.

FIG. 4 is a block diagram of an example of the configuration of processing functions of the CM.

The CM 201 includes an access controller 220, a rebuild controller 230, and a salvage controller 240. Processes executed by the access controller 220, the rebuild controller 230, and the salvage controller 240 are realized e.g. by executing predetermined programs by the CPU 211 of the CM 201.

Further, the storage device in the CM 201 stores a RAID management table 250, a bad data management table 260, a non-redundant write management table 270, and a salvage management table 280. These tables are stored e.g. in the SSD 213.

The access controller 220 accesses the HDDs in the DE 300 in response to an I/O request from the host apparatus 400. For example, when the access controller 220 receives a data read request, from the host apparatus 400, the access controller 220 reads out requested data from a predetermined HDD of the DE 300, and transmits the read data to the host apparatus 400. On the other hand, when the access controller 220 receives a data write request from the host apparatus 400, the access controller 220 writes data to be written, which has been received from the host apparatus 400, into a predetermined HDD of the DE 300.

In the following description, the operation of the access controller 220 for reading out data from a HDD in response to a read request from the host apparatus 400 is referred to as "host read". Further, the operation of the access controller 220 for writing data into a HDD in response to a write request from the host apparatus 400 is referred to as "host write".

Further, the access controller 220 manages data recorded in the HDDs of the DE 300 by RAID based on information set in the RAID management table 250. The access controller 220 manages recorded data according to a predetermined RAID level for each RLU (RAID Logical Unit). The RLU is a logical storage area formed by a combination of logical storage areas in the plurality of HDDs installed in the DE 300, and is also referred to as the RAID group.

The RAID management table 250 holds an RLU identification number, a RAID level which is applied to an associated RLU, information indicative of HDDs which belong to the RLU and a logical volume, information indicative of a controlled status of the RLU, and so on, on an RLU-by-RLU basis. The access controller 220 refers to the RAID management table 250 to thereby determine a HDD into which data is to be host-written and a RAID level used in host-writing the data. Note that in the present embodiment, the access controller 220 manages each RLU according to the associated RAID level at which data is duplexed. The RAID level at which data is duplexed includes RAID 1, RAID 4, and RAID 5.

Further, during a time period after one of HDDs belonging to an RLU has failed, thereby causing the redundancy of data recorded in the RLU to be lost, and before the rebuild process for a hot spare HDD becomes ready for being started, when executing host-writing of data into the RLU which has lost the redundancy of the data stored therein, the access controller 220 registers location information on where the data is host-written, in the non-redundant write management table 270.

When one of the HDDs belonging to the RLU has failed, the rebuild controller 230 executes "the rebuild process" for writing data recorded in the faulty HDD into a hot spare HDD. The rebuild controller 230 refers to the RAID management table 250 when executing the rebuild process to thereby determine how to generate the data recorded in the faulty HDD.

Further, if the rebuild controller 230 has failed in reading out data from one of the HDDs belonging to the RLU other than the faulty HDD during execution of the rebuild process, the rebuild controller 230 registers information on a location of the data which has not been successfully read out, in the bad data management table 260 and the salvage management table 280, and requests the salvage controller 240 to salvage the data which has not been successfully read out. No that when the access controller 220 receives a request from the host apparatus 400 for reading out data at the location the information on which is registered in the bad data management table 260, the access controller 220 sends an error response to the host apparatus 400.

The salvage controller 240 salvages data which has not been successfully read out in the rebuild process executed by the rebuild controller 230. In the salvage management table 280, location information on data to be salvaged (i.e. data which has not been successfully read out in the rebuild process) is registered. The salvage controller 240 sequentially executes the salvage process on data associated with the location information registered in the salvage management table 280 whereby it is possible to execute the salvage process asynchronously with the rebuild process. Further, the salvage controller 240 attempts to salvage data according to several processing patterns, described hereinafter, while consulting the non-redundant write management table 270, etc.

Figure 5:
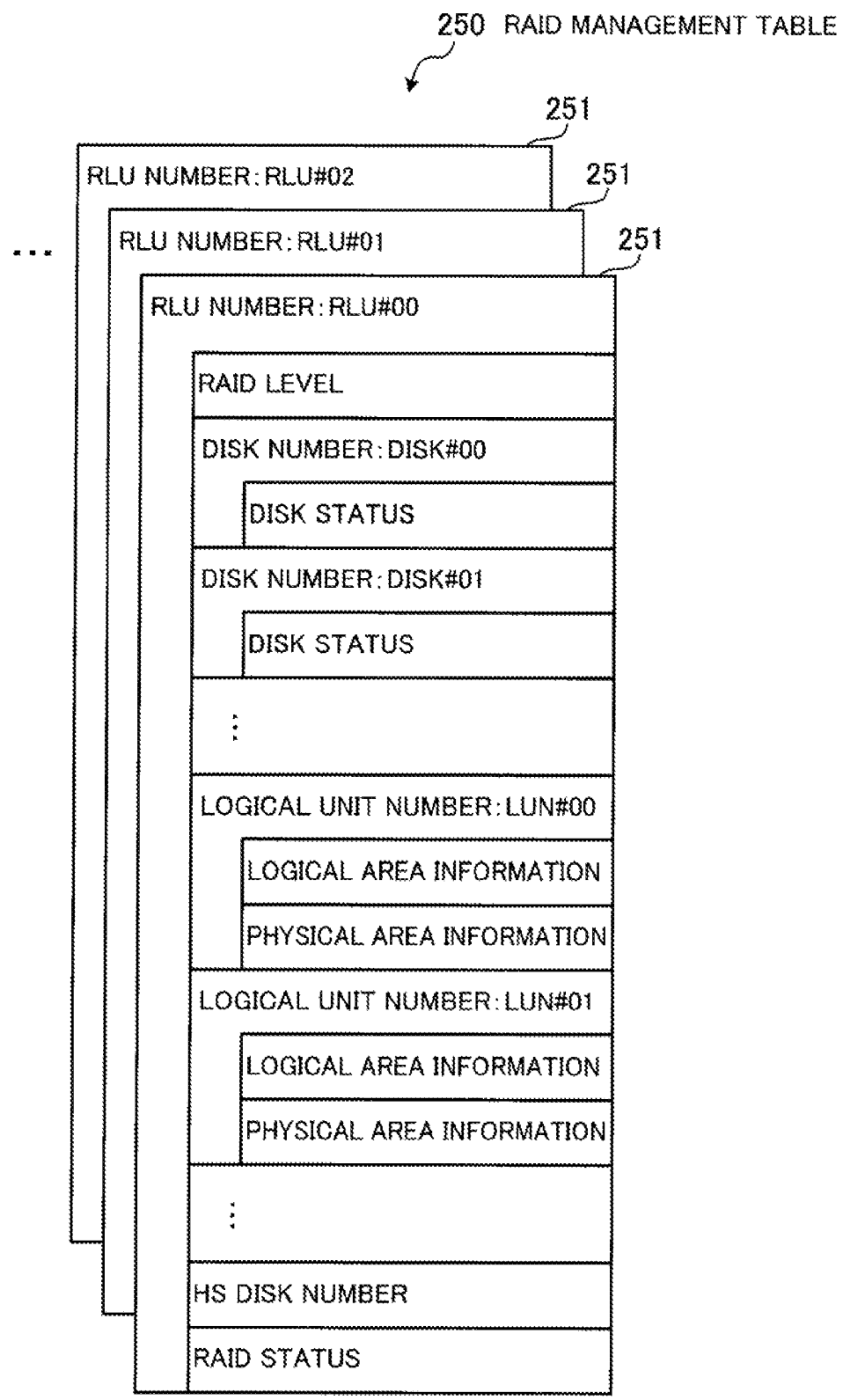
FIG. 5 illustrates an example of information registered in a RAID management table.

FIG. 5 illustrates an example of information registered in the RAID management table.

In the RAID management table 250, a record 251 is registered on an RLU-by-RLU basis. An RLU number for identifying an RLU associated therewith is given to each record 251. In the following description, an RLU number xx is denoted as "RLU #xx", and an RLU having an RLU number of "RLU #xx" is simply referred to as an "RLU #xx".

In each record 251, "RAID level", "disk number", "logical unit number", "HS disk number", and "RAID status" are registered.

The "RAID level" indicates a RAID level of an associated RLU when in normal operation. In the present embodiment, the "RAID level" is set to one of RAID 1, RAID 4, and RAID 5.

The "disk number" indicates an identification number of a HDD to which belongs a physical storage area constituting the associated RLU. Since each RLU is formed by a plurality of physical storage areas in a plurality of respective HDDs, the "disk number" is registered for each of the plurality of HDDs. In the following description, a disk number xx is denoted as "DISK #xx", and a HDD having the disk number of "DISK #xx" is simply referred to as the "DISK #xx".

Further, "disk status" is registered for each HDD identified by the disk number. The "disk status" indicates an operating condition of the corresponding HDD. For example, the "disk status" is set to one of "normal", "faulty", and "saved in HS". The status "normal" indicates that the corresponding HDD is normally operating, and the status "faulty" indicates that the corresponding HDD is faulty. The status "saved in HS" indicates that the rebuild process to rebuild data recorded in the corresponding HDD in a hot spare HDD has been completed, and the RLU is being operated after integrating the hot spare HDD.

The "logical unit number" indicates an identification number of a logical storage area referred to as the logical unit (or a logical volume), which is set for the associated RLU. It is possible to set a plurality of logical units for one RLU, and the "logical unit number" is registered on a logical unit-by-logical unit basis. In the following description, the logical unit number is referred to as the "LUN" in an abbreviated form. Further, No. xx logical unit is denoted as "LUN #xx", and a logical unit having a logical unit number of "LUN #xx" is simply referred to as the "LUN #xx".

Further, "logical area information" and "physical area information" are registered for each logical unit identified by the "logical unit number". In the "logical area information", a range of logical addresses (LBA: logical block address) given to each logical unit is registered. In the "physical area information", a range of physical addresses in each HDD, allocated to the logical unit, is registered.

When the LUN and the LBA of data to be accessed are designated, the CM 201 identifies a HDD and a location of a block (e.g. stripe number) where data to be accessed is stored, from the RAID level of the RLU to which a logical unit indicated by the LUN belongs and the physical area information on the HDD allocated to the logical unit.

The "HS disk number" is set only during the rebuild process, and indicates a number for identifying a hot spare HDD used for rebuilding the data.

The "RAID status" indicates a status of the corresponding RLU. For example, the "RAID status" is set to "normal operation", "non-redundant", "rebuild in progress", or "saved in HS".

The status "normal operation" indicates that all HDDs belonging to an RLU suffer from no abnormality and the RLU is normally operating in a state having redundancy of data. The status "non-redundant" indicates that one of HDDs belonging to an RLU is faulty, and redundancy of the data is lost. However, even in a state in which redundancy of the data is lost, when it is after an identification number of a hot spare HDD is registered in the "HS disk number" to make the rebuild process ready and before the rebuild process is completed, the "RAID status" is set to the status "rebuild in progress". The status "saved in HS" indicates a state in which processing for rebuilding data in the hot spare HDD has been completed, and the RLU is being operated after integrating the hot spare HDD.

Figure 6:
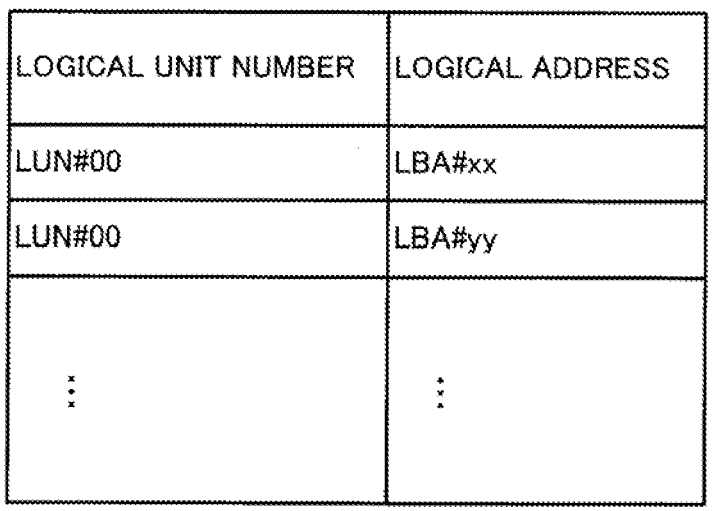
FIG. 6 illustrates an example of information registered in a bad data management table.

FIG. 6 illustrates an example of information registered in the bad data management table.

In the bad data management table 260, location information on data in a logical unit, which has been determined to be unreadable, by the rebuild controller 230 or the salvage controller 240, is registered as a combination of a logical unit number (LUN) and a logical address (LBA).

In the present embodiment, if data has not been successfully read out during the rebuild process, the LUN and LBA associated with the data which has not been successfully read out are registered in the bad data management table 260 by the rebuild controller 230. Further, if the salvage process for data registered in the bad data management table 260 is successful, location information on the data is deleted from the bad data management table 260. On the other hand, if the salvage process is not successful, the location information on the data remains in the bad data management table 260.

The data structure of the bad data management table 260 is not limited to the example illustrated in FIG. 6, but for example, may have a structure in which flag information indicative of whether or not a readout failure has occurred is associated with each of all LBAs of each LUN. Further, in the bad data management table 260, for example, a HDD disk number and physical addresses in a HDD may be registered as the location information in place of the LUN and LBA.

FIG. 7 illustrates an example of information registered in the non-redundant write management table.

When the RAID status of an RLU is "non-redundant", and host-writing of data is executed for a logical unit belonging to the RLU, information indicative of a location where data has been written is registered in the non-redundant write management table 270 as a combination of a LUN and a LBA.

The data structure of the non-redundant write management table 270 is not limited to the example illustrated in FIG. 7, but for example, may have a structure in which flag information indicative of whether or not host-writing of data has been executed in the status of "non-redundant" is associated with each of all LBAs of each logical unit. Further, for example, a HDD disk number and physical addresses in the HDD may be registered in place of the LUN and LBA, as the location information, in the non-redundant write management table 270.

Figure 8:
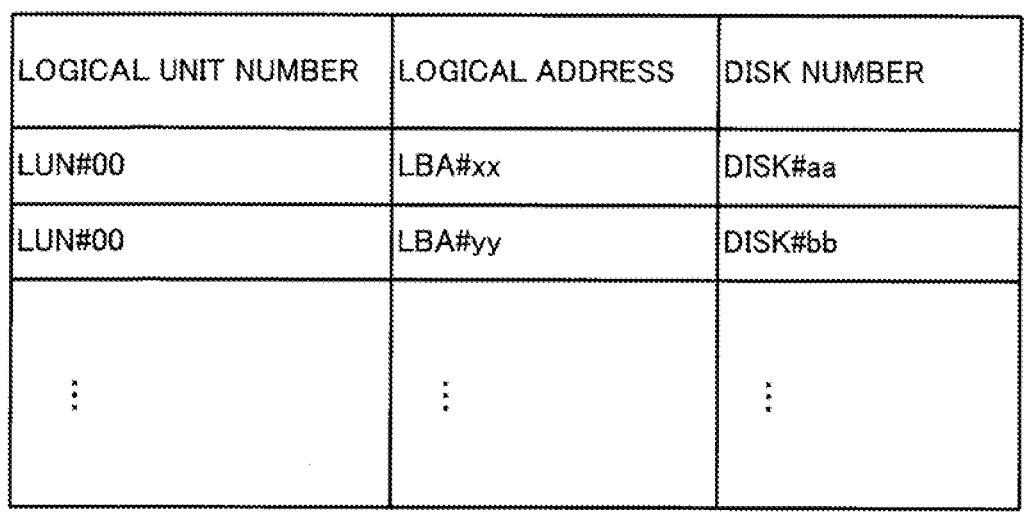
FIG. 8 illustrates an example of information registered in a salvage management table.

FIG. 8 illustrates an example of information registered in the salvage management table.

The salvage management table 280 is used for enabling the salvage controller 240 to execute the salvage process asynchronously with the rebuild process by temporarily holding information indicative of data to be salvaged. In the salvage management table 280, location information indicative of data to be salvaged (i.e. data which has not been successfully read in the rebuild process) is registered as a combination of a logical unit number (LUN), a logical address (LBA), and a disk number.

In the salvage management table 280, a physical address in a HDD indicated by the disk number may be registered in place of the LUN and LBA. Further, when the data to be salvaged is data managed by RAID 1 in the normal operation, it is not necessary to register information for identifying a HDD, such as a disk number, in the salvage management table 280. This is because when data is controlled according to RAID 1, the salvage controller 240 easily determines that the HDD from which data has not been successfully read out is one of the two HDDs belonging to the RLU, which is not faulty.

Figure 9:
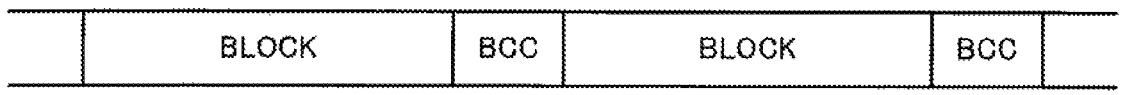
FIG. 9 illustrates an example of a data recording format in a HDD.

FIG. 9 illustrates an example of a data recording format used in the HDD.

Data recorded in the HDDs of the DE 300 is divided into blocks each having a fixed length. Further, in each HDD, a BCC (Block Check Code) is given to a block area where each block is stored. Usually, an error detection code is recorded in the BCC, and when a block is read out, the integrity of a block to be read is checked based on the BCC associated with the block. Further, it is also possible to record information indicative of attributes of an associated block area in the BCC. For example, in a hot spare HDD where data is to be rebuilt, if data to be written into a block area has not been successfully generated during the rebuild process, information indicative of "bad data" is written into the BCC associated with the block area.

Figure 10:
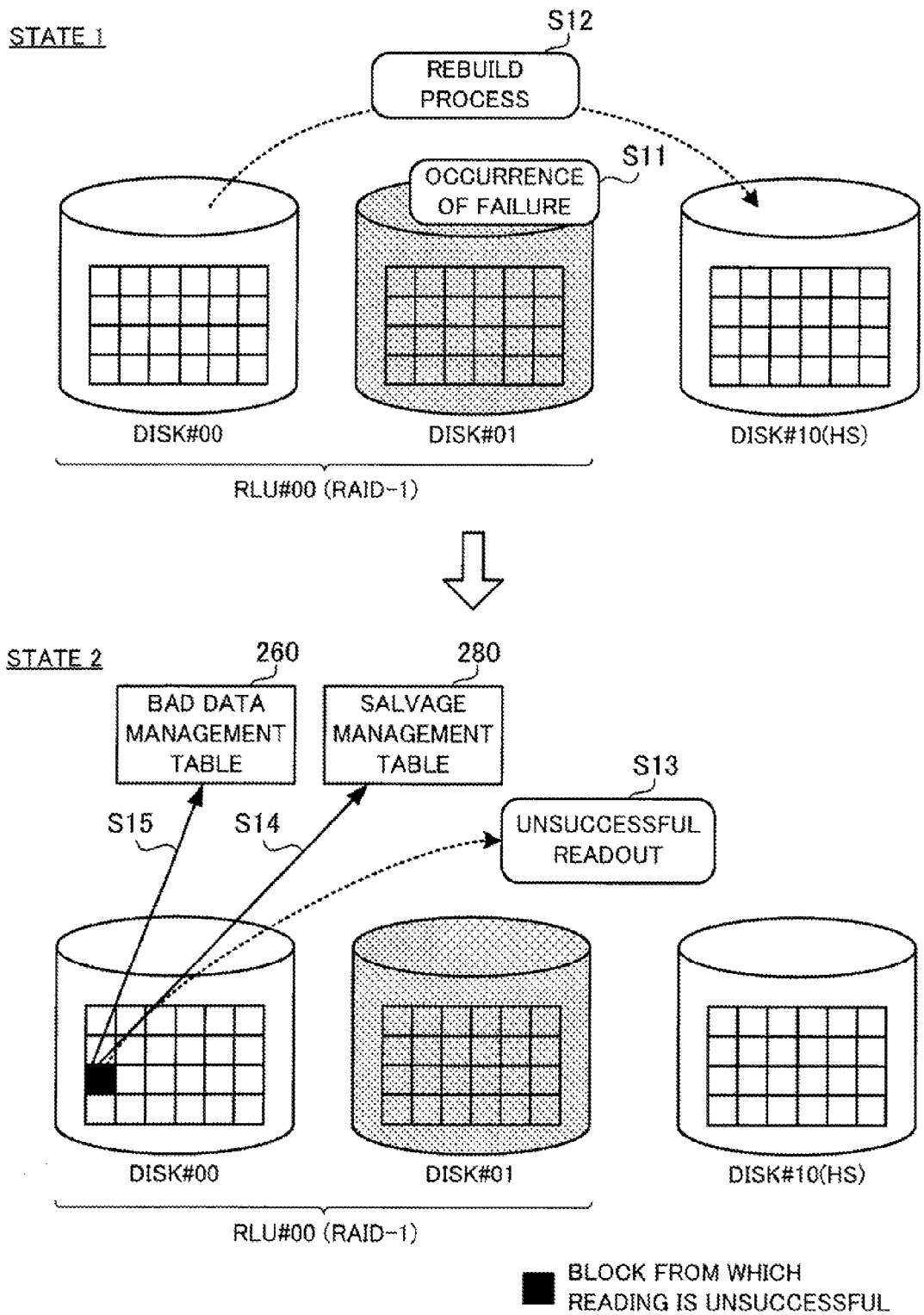
FIG. 10 illustrates an example of a state in which a salvage process is started.

Next, a description will be given of the salvage process. First, FIG. 10 illustrates an example of a state in which the salvage process is started. FIG. 10 illustrates a case where data is controlled according to RAID 1.

In a "state 1" in FIG. 10, the RLU #00 is formed by the storage areas in DISKs #00 and #01, and these storage areas are managed by RAID 1. In this state, if the DISK #01 fails (step S11), the rebuild controller 230 executes the rebuild process to store data recorded in the DISK #01 of the RLU #00 in a DISK #10 which is a hot spare (step S12). Since the RLU #00 is in a state set to RAID 1, the data of the RLU #00 recorded in the DISK #00 is directly read out, and is copied into the hot spare DISK #10 in the rebuild process.

When the rebuild process is normally completed, the data of the RLU #00 recorded in the DISK #01 is completely restored in the hot spare DISK #10. At this time, the hot spare DISK #10 is integrated into the RLU #00 in place of the faulty DISK #01, whereby the access controller 220 continues host-reading and host-writing of data in a state in which redundancy of the data of the RLU #00 has been completely recovered.

However, as illustrated in a "state 2" in FIG. 10, if the rebuild controller 230 has failed in reading out data from one block on the DISK #00 during the rebuild process (step S13), it is impossible to copy the data which has not been successfully read out into the hot spare DISK #10, and as a result this data is lost. On the other hand, the salvage controller 240 executes processing for salvaging the data which has not been successfully read out, and stores rebuilt data in a corresponding location in the hot spare DISK #10.

More specifically, if the rebuild controller 230 fails in reading out data from the DISK #00 during the rebuild process, the rebuild controller 230 registers location information on the data which has not been successfully read out, in the salvage management table 280 (step S14). The salvage controller 240 executes the salvage process on the data indicated by the location information registered in the salvage management table 280.

Further, the rebuild controller 230 registers location information of the data which has not been successfully read out also in the bad data management table 260 (step S15). When the access controller 220 receives a request from the host apparatus 400 for reading out data corresponding to the location information registered in the bad data management table 260, the access controller 220 sends an error response to the host apparatus 400. This prevents unnecessary access to data which has not been successfully read out from being performed by the access controller 220.

Note that it is unnecessary to register the location information in the bad data management table 260 at this time point. For example, when it is impossible to salvage the data which has been unsuccessfully read out, the location information may be registered in the bad data management table 260 by the salvage controller 240.

Note that the order of the steps S14 and S15 may be reversed, or the steps S14 and S15 may be executed in parallel.

By the way, as mentioned above, the rebuild process is intended to mean storing of data recorded in a faulty HDD in a HDD where data is to be rebuilt (hot spare HDD in the present embodiment). As in the case of FIG. 10, in the rebuild process executed for an RLU of RAID 1, data read out from a HDD which is not faulty is directly copied into a HDD used for rebuilding the data.

The salvage process is originally a process storing data which has been recorded in a faulty HDD in a HDD used for rebuilding the data using some method even when a readout failure has occurred during the rebuild process. However, the salvage process in the RLU of RAID 1 is equivalent to a process for storing the same data as the data which has not been successfully read out in a HDD used for rebuilding the data.

On the other hand, in the rebuild process executed for the RLU of RAID 4 or RAID 5, the data which has been recorded in a faulty HDD is rebuilt by calculation based on the data read out from the other HDD which is not faulty. Therefore, differently from the salvage process executed for the RLU of the RAID 1, the salvage process executed for the RLU of RAID 4 or RAID 5 is not equivalent to processing for storing the same data as the data which has not been successfully read out in a HDD used for rebuilding the data.

In the following description, the salvage process executed in the RLU of RAID 1 will be mainly described, and a supplementary description of the salvage process executed for the RLU of RAID 4 or RAID 5 as well will be given on an as-needed basis. Note that in the supplementary description of the salvage process executed for the RLU of RAID 4 or RAID 5, it is assumed that the RLU is formed by storage areas in the DISKs #00 to #04.

The salvage controller 240 executes the salvage process using the following salvaging methods (1) to (3):

Salvaging method (1): Data is salvaged based on data recorded in a hot spare HDD.

Salvaging method (2): A faulty HDD is subjected to restarting, and data is salvaged based on data read from the HDD which is at least restarted.

Salvaging method (3): A HDD from which data has not been successfully read out is subjected to restarting, and data is salvaged based on data read from the HDD which is at least restarted.

Hereinafter, details of the above-mentioned salvaging methods (1) to (3) will be described.

FIG. 11 illustrates preprocessing for execution of the salvaging method (1).

A "state 11" in FIG. 11 indicates a case where a failure of the DISK #01 forming the RLU #00 occurred, similarly to the "state 1" in FIG. 10. Note that although the rebuild controller 230 selects a hot spare HDD to be used for rebuilding the data at this time, all storage areas in the hot spare HDD to be used for rebuilding the data are set to a BCC error condition in advance. The term "BCC error condition" used here is intended to mean a condition in which the BCC is set to such a value that when data in a block is read out, a readout failure is detected from the BCC associated with the block. However, in the BCC error condition, it is desirable that the BCC is set to a value other than a value corresponding to information indicative of the above-mentioned bad data. By differentiating the BCC error condition and a condition in which the BCC indicates bad data, when the BCC indicates bad data, it is possible to clearly recognize the impossibility of salvaging data in a block associated with the BCC.

By the way, even after the DISK #01 has failed, the access controller 220 continues host-reading and host-writing of data from and into the RLU #00 using the DISK #00 as the remaining HDD constituting the RLU #00 in a state without redundancy of the data. However, as illustrated by a "state 12" in FIG. 11, when the access controller 220 receives a write request from the host apparatus 400 during a time period after the hot spar DISK #10 in which the data is to be rebuilt is made ready for use (specifically, after the DISK #10 has been set to the "HS disk number" in the record 251 associated with the RLU #00 in the RAID management table 250) and before the rebuild process is completed (step S21), the access controller 220 executes host-writing of data not only for the DISK #00, but also for the DISK #10 where the data is to be rebuilt (steps S22 and S23).

If the RLU #00 is managed by RAID 1, when in the "state 12", the access controller 220 writes the data requested by the host apparatus 400 into the DISK #00 (step S22), and writes the same data also into a corresponding block on the hot spare DISK #10 (step S23). In the hot spare DISK #10, an error detection code is overwritten in the BCC corresponding to the block in which the data has been written, which makes it possible to normally read out from this block. As a result, even when the rebuild process has not been executed for a block on the DISK #10 into which data has been host-written, the latest data has been written and stored in the block.

Now, a supplemental description of a case where the RLU #00 is at either RAID 4 or RAID 5 is given. When the RLU operated by RAID 4 or RAID 5 is formed by storage areas in the DISKs #00 to #04, the host-write operation during normal operation is performed as follows: The access controller 220 divides data requested to be written into data each having a fixed length. The access controller 220, for example, calculates a parity P0 based on the sequential divided data D0 to D3. In a case where the RLU #00 is managed by RAID 4, the access controller 220 writes the divided data D0 to D3 and the parity P0 into predetermined HDDs, respectively. On the other hand, in a case where the RLU #00 is managed by RAID 5, the access controller 220 writes the divided data D0 to D3 and the parity P0 into the DISKs #00 to #04 in a dispersed manner.

For example, if writing of new divided data D0 to D3 is requested in a state in which the DISK #04 is faulty, preprocessing illustrated by the "state 12" in FIG. 11 is executed as follows: When data to be written into the DISK #04 is divided data D3, the access controller 220 writes divided data D0 to D2 and the parity P0 calculated based on these divided data items into the other DISKS #00 to #03 (step S22), and writes the divided data D3 into the DISK #10 (step S23). Further, for example, when data to be written into the DISK #04 is the parity P0, the access controller 220 writes the divided data D0 to D3 into the other DISKS #00 to #03 (step S22), calculates the parity P0 based on the divided data D0 to D3, and writes the calculated parity P0 into the DISK #10 (step S23).

However, when e.g. only the divided data D3 out of the divided data D0 to D3 is updated, data writing is not performed for the HDDs in which the divided data D0 to D2 are recorded. Therefore, in this case, data writing into the faulty DISK #04 is not necessarily performed, but only when the divided data D3 or the parity P0 were to be written into the DISK #04, the divided data D3 or the parity P0 is written into the DISK #10.

That is, in all of the cases where the RLU #00 is at respective levels of RAID 1, RAID 4, and RAID 5, in preprocessing illustrated by the "state 12" in FIG. 11, upon receipt of a write request from the host apparatus 400, if data requested to be written includes data to be written into a faulty HDD, the access controller 220 writes this data into a hot spare HDD.

Figure 12:
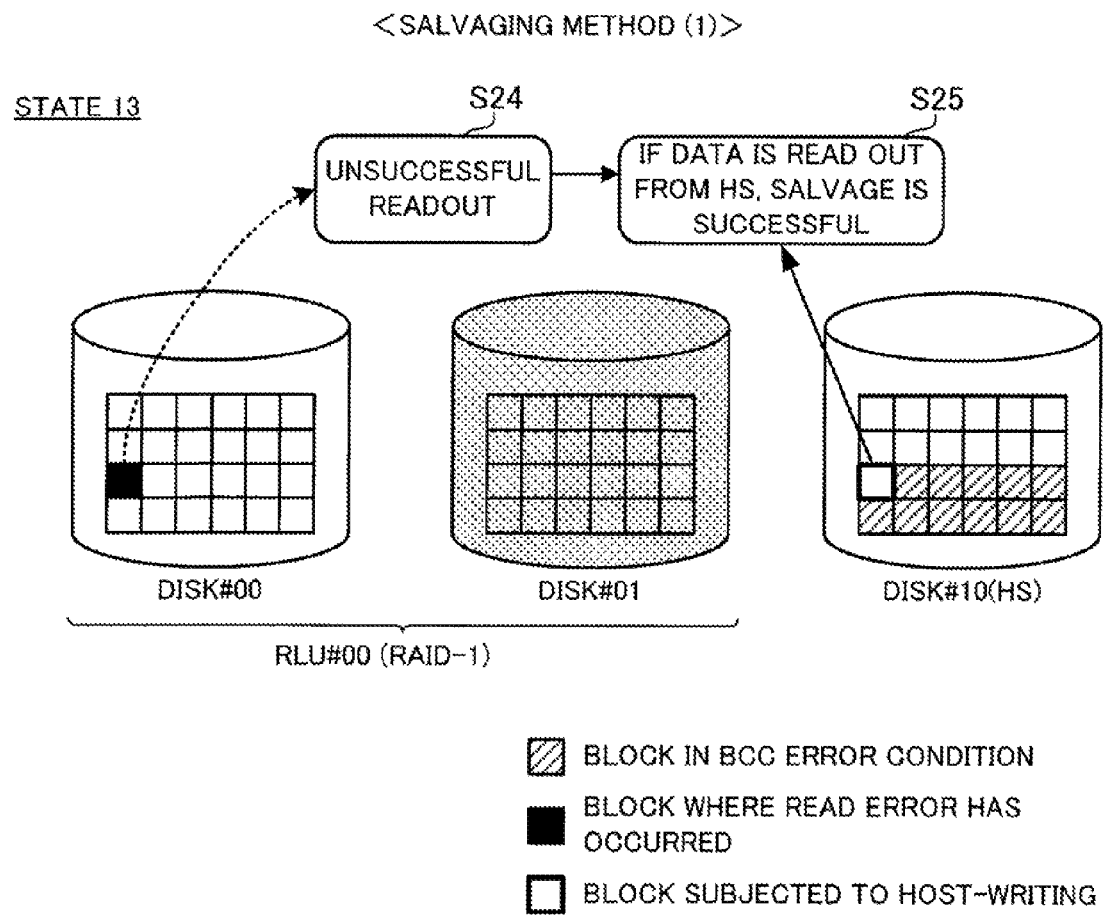
FIG. 12 illustrates the salvaging method (1)

FIG. 12 illustrates the salvaging method (1).

In the rebuild process for the data recorded in the DISK #01, the rebuild controller 230 reads out data from all of the areas within the DISK #00 from which data is to be read out, irrespective of whether or not data has been written in response to a request from the host apparatus 400 as illustrated by the "state 12" in FIG. 11. Let it be assumed, as illustrated by a "state 13" in FIG. 12, that during the rebuild process for the data recorded in the DISK #01 executed by the rebuild controller 230, data was not successfully read from a block on the DISK #00 (step S24). In this case, the salvage controller 240 determines whether or not the data has been written into a block on the hot spare DISK #10, corresponding to the block from which data reading was unsuccessful. This determination is performed by determining whether or not the data is successfully read out from the corresponding block on the DISK #10 (step S25). If the data has been successfully read out from the corresponding block on the DISK #10, this means that the latest data has been stored in the corresponding block by the host-write operation, and hence the salvage controller 240 determines that the data has been successfully salvaged. On the other hand, if a BCC error is detected in reading the data from the block on the DISK #10, the salvage controller 240 determines that the salvaging of the data is unsuccessful. In this case, the salvage controller 240 tries another salvaging method.

The procedure of the above-described salvaging method (1) illustrated in FIG. 12 is similarly executed in both of the cases where the RLU #00 is at respective levels of RAID 4 and RAID 5. That is, if data has been successfully read out from a corresponding block on the hot spare DISK #10 (block having the same stripe number as that of the block from which data has not been successfully read out), the salvage controller 240 determines that the data has been successfully salvaged.

Figure 13:
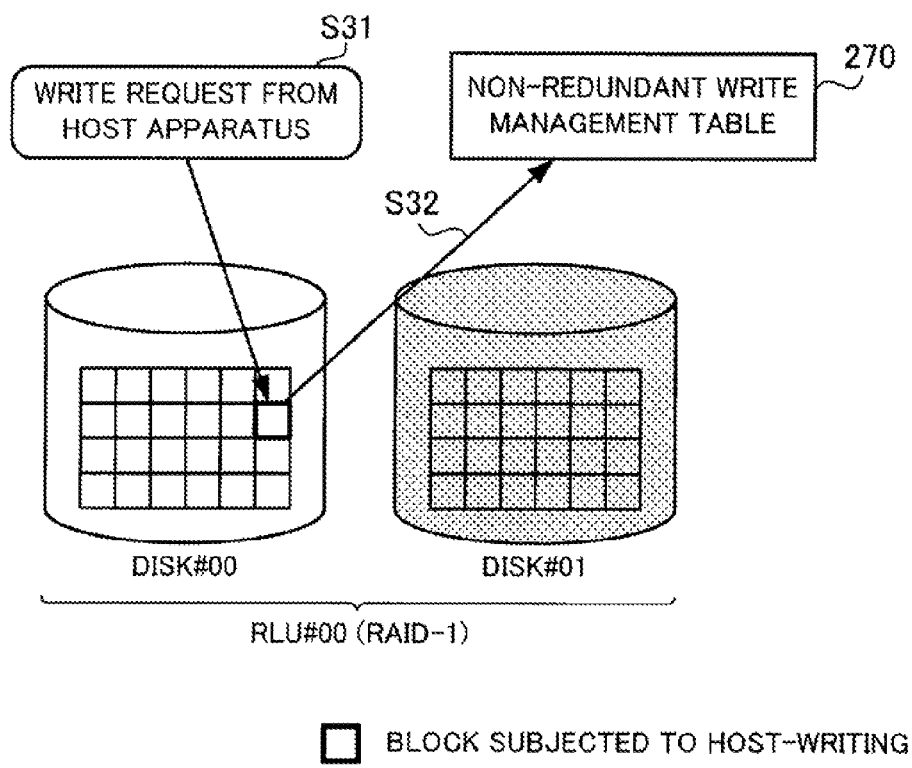
FIG. 13 illustrates preprocessing for execution of salvaging methods (2) and (3)

Next, FIG. 13 illustrates preprocessing for execution of the salvaging methods (2) and (3).

A "state 21" in FIG. 13 indicates a case where the DISK #01 constituting the RLU #00 has failed, similarly to the "state 1" in FIG. 10. However, the "state 21" indicates a state after the DISK #01 has failed and before the hot spare DISK #10 where data is to be rebuilt is made ready for use (specifically, until the "HS disk number" in the record 251 associated with the RLU #00 in the RAID management table 250 is set to the DISK #10). In the "state 21", the access controller 220 continues host-reading and host-writing of data from and into the RLU #00 using the DISK #00 alone.

As preprocessing for execution of the salvaging methods (2) and (3), when in the "state 21", upon receipt of a write request for the RLU #00 from the host apparatus 400 (step S31), the access controller 220 writes data into a corresponding block on the DISK #00. Also, the access controller 220 registers location information (LUN and LBA associated with a block into which data has been written) indicative of where the data has been written, in the non-redundant write management table 270 (step S32).

If a host write occurs in the "state 21", the data is written in in a non-redundant state. Therefore, in the non-redundant write management table 270, location information on data having no redundancy, out of the data recorded in the RLU #00, is registered.

Note that the procedure of the above-described preprocessing illustrated in the "state 21" is similarly executed in both of the cases where the RLU #00 is at respective levels of RAID 4 and RAID 5, and the access controller 220 registers information on a location where host-writing is performed, in the non-redundant write management table 270.

Figure 14:
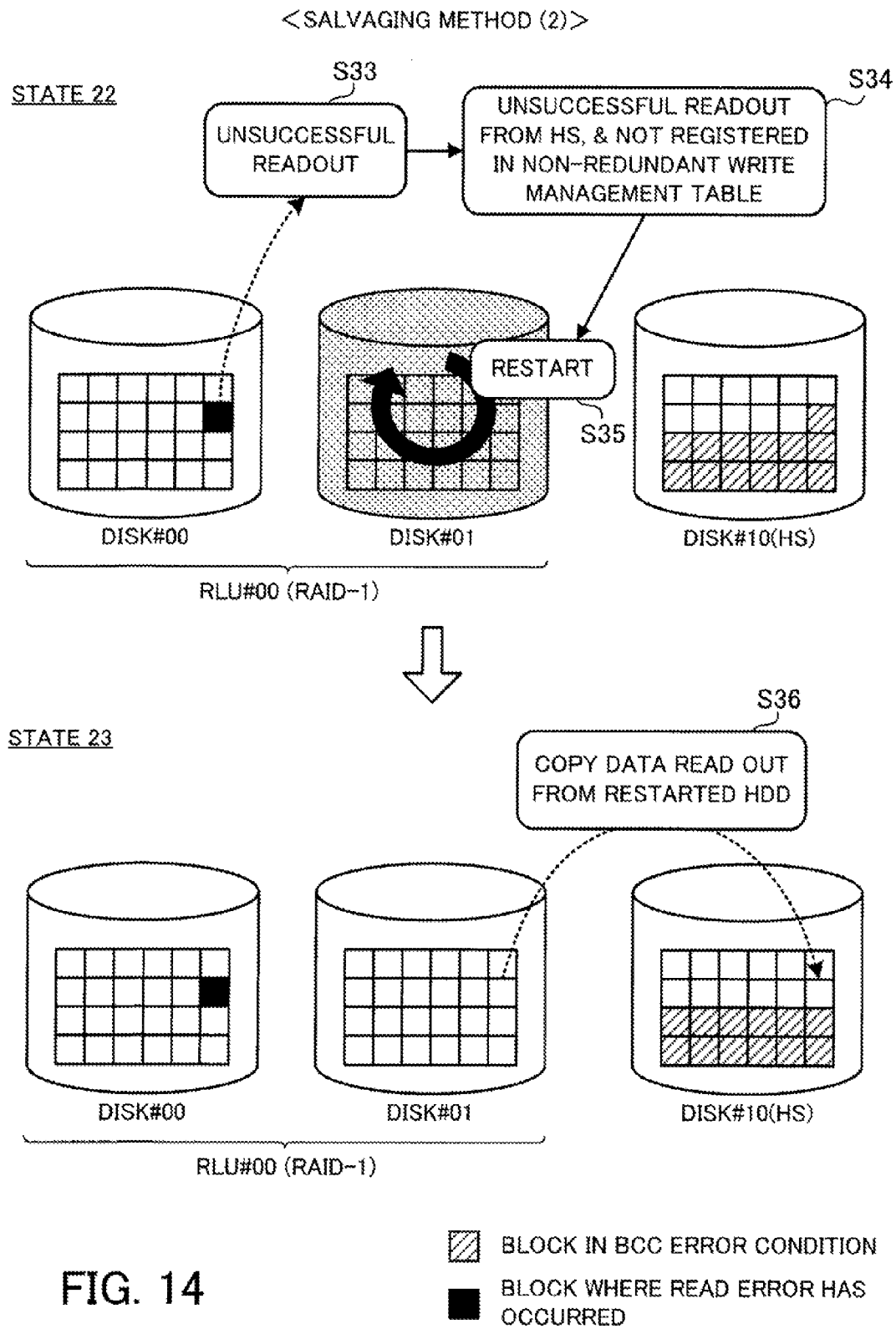
FIG. 14 illustrates a procedure of the salvaging method (2)

FIG. 14 illustrates the salvaging method (2).

A "state 22" in FIG. 14 indicates a state in which the rebuild process for the hot spare DISK #10 is started from the "state 21" in FIG. 13. When the RLU #00 is at RAID 1, the rebuild controller 230 reads out the data of the RLU #00, recorded in the DISK #00, and copies the read data to the DISK #10. Let it be assumed that the rebuild controller 230 has failed in reading out the data from the DISK #00 during the rebuild process mentioned above (step S33).

The salvage controller 240 determines whether or not host-writing of data has been executed for at least one of the block on the DISK #00 from which data reading was unsuccessful, and a block on the DISK #10 corresponding to the above-mentioned block, after the DISK #01 has failed and until now. More specifically, when the salvage controller 240 has failed in reading out the data from the corresponding block on the hot spare DISK #10 in the above-described salvaging method (1), and execution of host-writing of data into a location corresponding to the block from which data reading was unsuccessful is not registered in the non-redundant write management table 270, the salvage controller 240 determines that host-writing of data has not been executed for the corresponding block on at least one of the DISK #00 and the DISK #10, after the DISK #01 has failed and until now (step S34).

If it is determined that host-writing of data has not been executed, there is a high possibility that the data to be rebuilt in the hot spare DISK #10, corresponding to the data which has not been successfully read out from the DISK #00, exists only in the faulty DISK #01. From this fact, the salvage controller 240 restarts the faulty DISK #01 (step S35), and checks whether or not it is possible to read out the data to be rebuilt in the DISK #10, from the restarted DISK #01.

As indicated in a "state 23" in FIG. 14, the salvage controller 240 reads out the data from a block on the restarted DISK #01, corresponding to the block on the DISK #00, from which data reading was unsuccessful. If the data has been successfully read out, the salvage controller 240 copies the read data to a block on the hot spare DISK #10, which corresponds to the same stripe number. In this case, the dada is successfully salvaged (step S36).

Note that the process in the salvaging method (2) illustrated in FIG. 14 is similarly executed in both of the cases where the RLU #00 is at respective levels of RAID 4 and RAID 5. That is, when the data has been successfully read out from the corresponding block on the restarted DISK #01, the salvage controller 240 copies the read data into a block of the same stripe number in the hot spare DISK #10.

Figure 15:
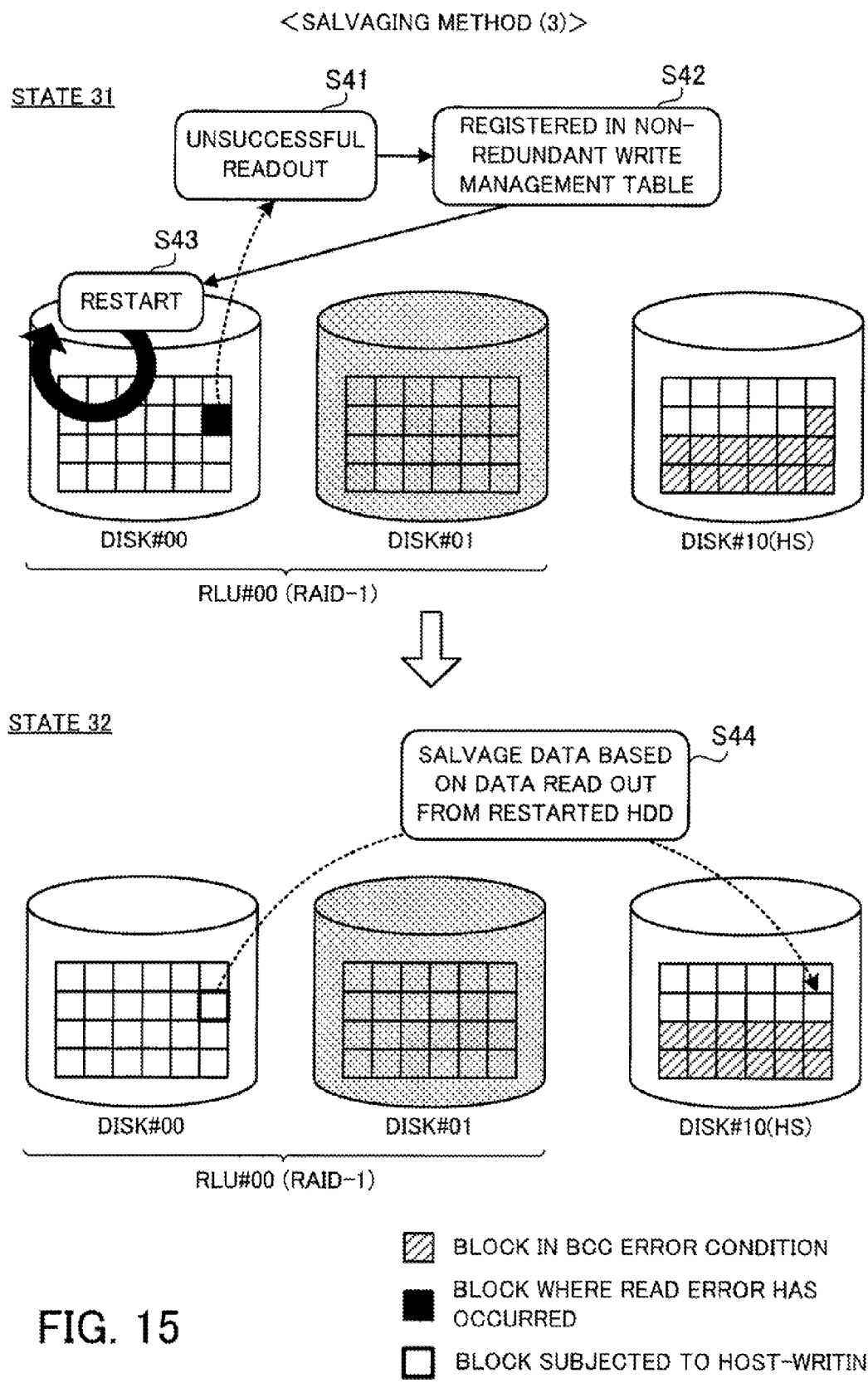
FIG. 15 illustrates a procedure of the salvaging method (3)

FIG. 15 illustrates the salvaging method (3).

Let it be assumed that the rebuild process is started from the "state 21" in FIG. 13, and the rebuild controller 230 has failed in reading out the data from the DISK #00 during the rebuild process (step S41). As illustrated in a "state 31" in FIG. 15, the salvage controller 240 determines whether or not execution of host-writing of data for a location corresponding to the block from which data reading was unsuccessful is registered in the non-redundant write management table 270.

If execution of the host writing of data is registered in the non-redundant write management table 270, the latest data has not been recorded in the block on the DISK #01, corresponding to the data which has not been successfully read out. Also, the data is not recorded in the block on the DISK #10, corresponding to the data which has not been successfully read out, and this block is supposed to be in the BCC error condition. From this fact, although the salvage controller 240 has failed in reading out the data, the salvage controller 240 restarts the DISK #00 in which the latest data may remain (step S43), and again attempts to read out the data from the location in the restarted DISK #00 from which data reading was unsuccessful. For example, in a case where the failure of the data reading during the rebuild process is caused by a temporary factor, there is a possibility of the data being successfully read out after the DISK #00 is restarted.

As illustrated in a "state 32" in FIG. 15, if the data has been successfully read out from the location in the restarted DISK #00 from which data reading was unsuccessful, the salvage controller 240 salvages the data to be recorded in the DISK #10 based on the read data (step S44). When the RLU #00 is at RAID 1, the salvage controller 240 copies the data read from the restarted DISK #00 into a corresponding block on the hot spare DISK #10.

Assuming that the RLU #00 is at either RAID 4 or RAID 5, the storage areas of the RLU #00 are formed by the DISKs #00 to #04, the DISK #04 has failed, and the data has not been successfully read out from the DISK #00, the following processing is executed in the step S44 in the "state 32": The salvage controller 240 identifies the HDD from which the data has not been successfully read out, based on the location information registered in the salvage management table 280, and restarts the identified HDD (DISK #00 in this example). The salvage controller 240 generates data to be stored in the hot spare DISK #10 based on the data read out from the restarted DISK #00 and the data read out from blocks, corresponding to the same stripe number, on the DISKs #01 to #03 which remain free from failure.

For example, let it be assumed that reading of the divided data D0 from the DISK #00 was unsuccessful, and the parity P0 associated with the divided data D0 is recorded in the faulty DISK #04. In this case, the salvage controller 240 calculates the parity P0 based on the divided data D0 read out from the restarted DISK #00 and the divided data D1 to D3 read out from the DISKs #01 to #03 which remain free from failure, and stores the calculated parity P0 in the hot spare DISK #10.

Further, for example, let it be assumed that reading of the divided data D0 from the DISK #00 was unsuccessful, and the divided data D3 is recorded in the faulty DISK #04. In this case, the salvage controller 240 calculates the divided data D3 based on the divided data D0 read out from the restarted DISK #00, and the divided data D1 and D2 and the parity P0 read out from the DISKs #01 to #03 which remain free from failure, and stores the calculated divided data D3 in the hot spare DISK #10.

Figure 16:
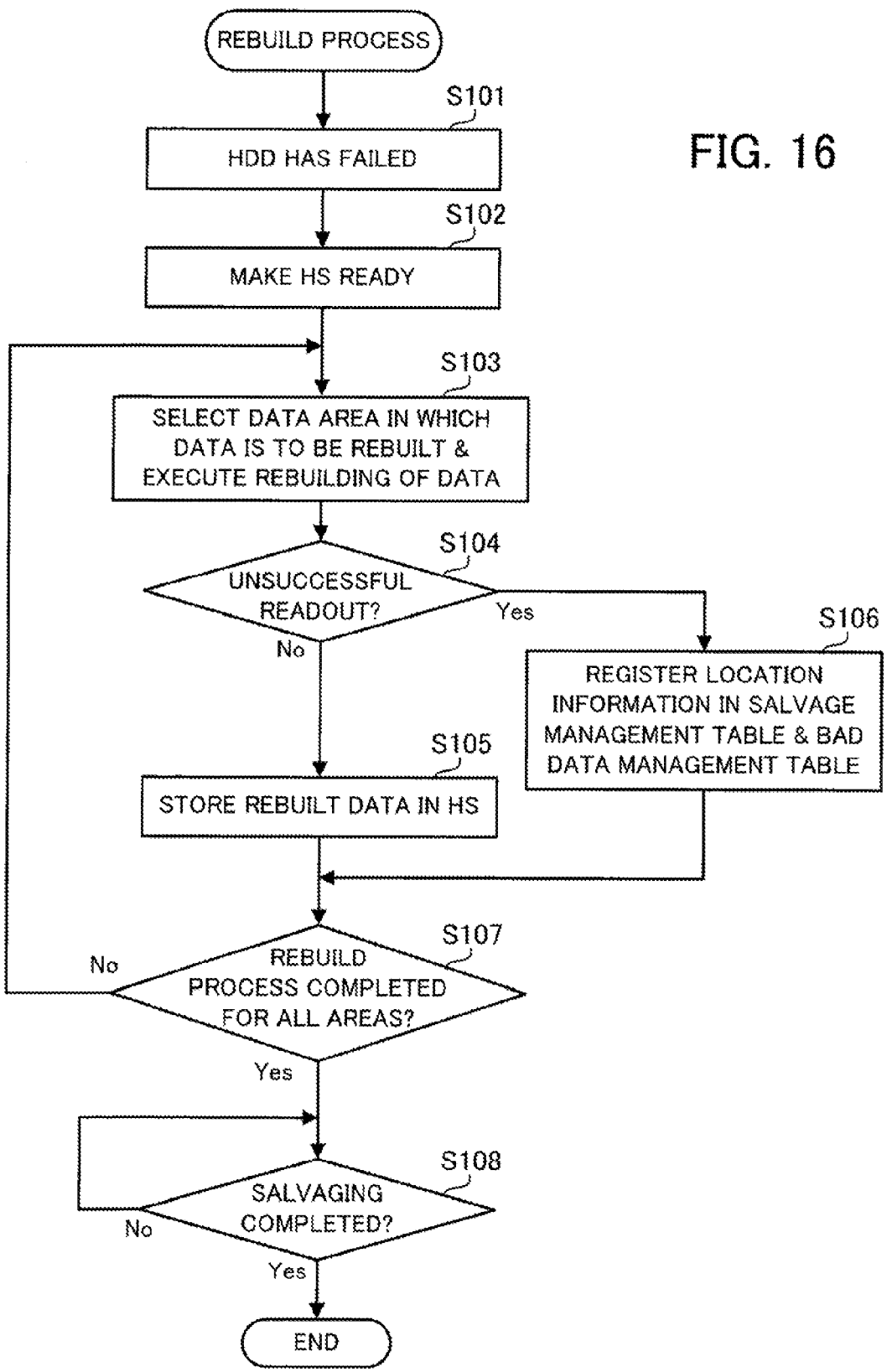
FIG. 16 is a flowchart of an example of a rebuild process.

Next, a description will be given of the salvage process using the above-described salvaging methods (1) to (3) with reference to a flowchart. First, FIG. 16 is a flowchart of an example of a rebuild process.

[Step S101] Upon detection of a failure in a HDD in the DE 300, the access controller 220 notifies the rebuild controller 230 of the disk number of the faulty HDD, and the RLU number of the RLU to which the faulty HDD belongs. Hereinafter, the description is continued assuming that one of the HDDs belonging to the RLU #00 has failed.

The rebuild controller 230 having received the notification from the access controller 220 extracts the record 251 of the RLU #00 from the RAID management table 250, and updates the "disk status" associated with the disk number of the faulty HDD to "faulty", and the "RAID status" to "non-redundant" in the extracted record 251.

The update of the "disk status" associated with the disk number of the faulty HDD to "faulty" causes the faulty HDD to be separated from the RLU #00. Upon separation of the faulty HDD from the RLU #00, the faulty HDD may be powered off. Alternatively, for example, the faulty HDD may be powered off immediately before the faulty HDD is replaced by a new HDD.

[Step S102] The rebuild controller 230 makes a hot spare HDD where data is to be rebuilt ready for use. More specifically, the rebuild controller 230 selects a hot spare HDD to be used for rebuilding the data and registers the disk number of the selected HDD in the "HS disk number" in the record 251 of the RLU #00 in the RAID management table 250. Further, the rebuild controller 230 updates the "RAID status" in the record 251 of the RLU #00 to "rebuild in progress". As a consequence, the hot spare HDD has been made ready for use, whereby the rebuild controller 230 is allowed to start the rebuild process.

[Step S103] The rebuild controller 230 selects a data area to be rebuilt from the logical units belonging to the RLU #00 on a predetermined number of LBAs-by-a predetermined number of LBAs basis. The rebuild controller 230 executes rebuilding data corresponding to the selected data area.

The phrase "rebuilding data" is intended to mean generating data to be stored in the hot spare HDD, and hereinafter, the generated data is referred to as the "rebuilt data". For example, when the RLU #00 is normally managed by RAID 1, the rebuild controller 230 generates rebuilt data by simply reading out data from a HDD belonging to the RLU #00, which is not faulty. On the other hand, when the RLU #00 is normally managed by RAID 4 or RAID 5, the rebuild controller 230 reads out data from locations of the same stripe number in respective HDDs belonging to the RLU #00, which are not faulty, and generates rebuilt data by calculation based on the read data.

[Step S104] During generation of the rebuilt data in the step S103, if reading of the data from the HDD which is not faulty is successful (No to the step S104), the rebuild controller 230 executes a step S105. On the other hand, if reading of the data from the HDD which is not faulty is unsuccessful, and hence the rebuilt data has not been generated (Yes to the step S104), the rebuild controller 230 executes a step S106.

[Step S105] The rebuild controller 230 stores the rebuilt data generated in the step S103 in a corresponding area in the hot spare HDD.

[Step S106] The rebuild controller 230 registers the LUN and LBA indicative of the data area selected in the step S103, and the disk number of the HDD from which reading of the data in the step S104 was unsuccessful, in the salvage management table 280. Further, the rebuild controller 230 registers the LUN and LBA indicative of the data area selected in the step S103 in the bad data management table 260. Note that to which of the salvage management table 280 and the bad data management table 260 the information is to be first registered is not particularly limited.

[Step S107] The rebuild controller 230 determines whether or not the rebuild process has been completed for all data areas of all logical units which belong to the RLU #00. If the rebuild process has not been completed for all data areas (No to the step S107), the rebuild controller 230 returns to the step S103, and executes the rebuild process for the next data area. On the other hand, if the rebuild process has been completed for all data areas (Yes to the step S107), the rebuild controller 230 executes a step S108.

[Step S108] The rebuild controller 230 determines whether or not the salvage process for the RLU #00 by the salvage controller 240 has been completed. Here, when no location information belonging to the RLU #00 is registered in the salvage management table 280, the rebuild controller 230 determines that the salvage process for the RLU #00 has been completed. Note that if data reading during the rebuild process for the RLU #00 has been successful (i.e. if the answer to the question of the step S104 is No), the location information which belongs to the RLU #00 is not registered in the salvage management table 280.

If it is determined that the salvage process for the RLU #00 has been completed (Yes to the step S108), the rebuild controller 230 updates the "disk status" associated with the faulty HDD to "saved in HS", and updates the "RAID status" to "saved in HS" in the record 251 of the RLU #00 in the RAID management table 250. As a consequence, the rebuild process is completed.

Figure 17:
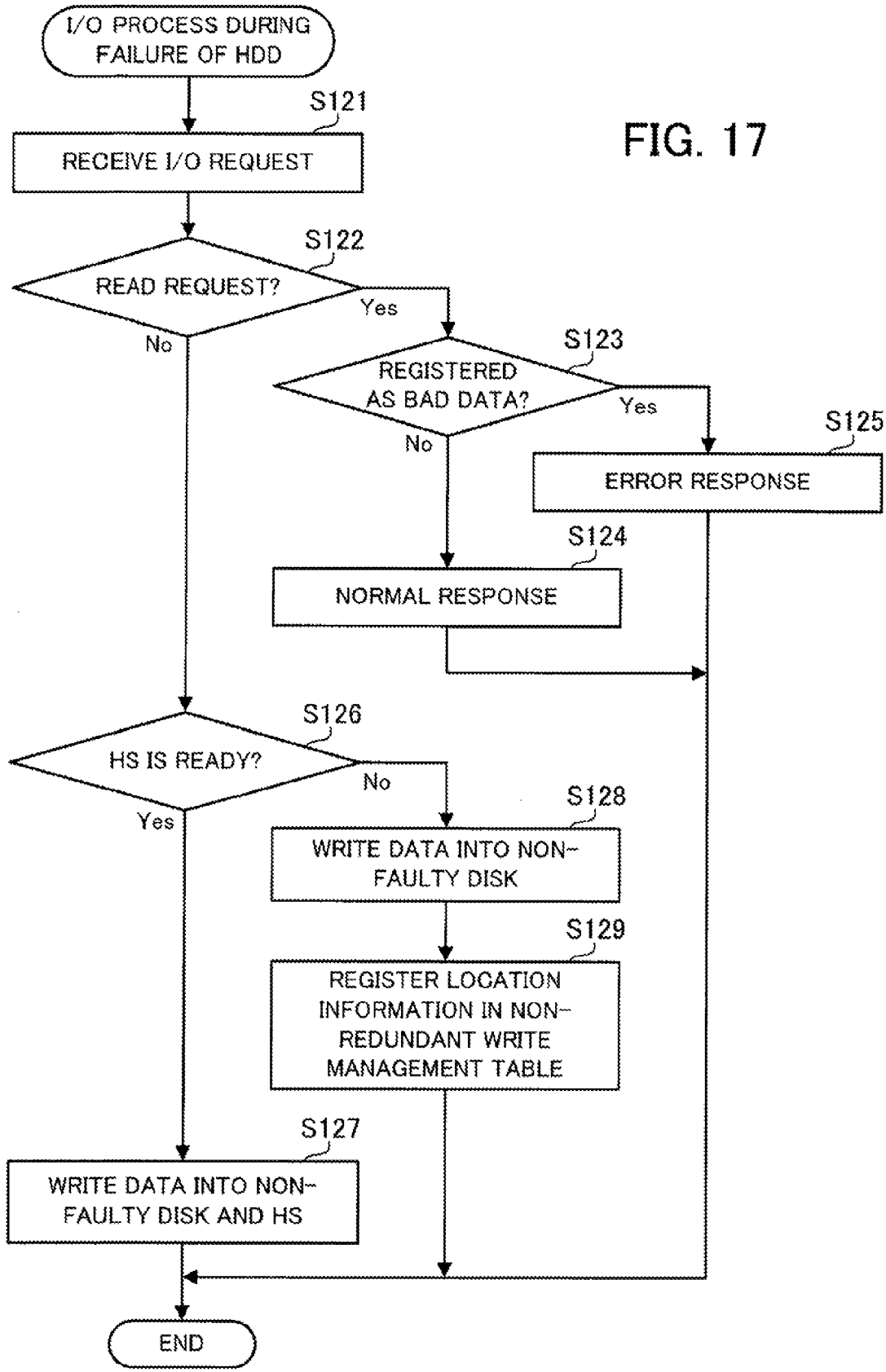
FIG. 17 is a flowchart of an example of an I/O process executed by an access controller.

Next, FIG. 17 is a flowchart of an example of an I/O process executed by the access controller. FIG. 17 illustrates the I/O process executed during a time period after one of the HDDs belonging to the RLU #00 to be subjected to the I/O process has failed and before the rebuild process for the RLU #00 is completed. This time period is a time period during which the "disk status" associated with the faulty HDD is "faulty" and the "RAID status" is the "non-redundant" or "rebuild in progress", in the record 251 of the RLU #00 in the RAID management table 250.

[Step S121] the access controller 220 receives an I/O request to the RLU #00 from the host apparatus 400.

[Step S122] If the I/O request is a read request (Yes to the step S122), a step S123 is executed, whereas if the I/O request is a write request (No to the step S122), a step S126 is executed.

[Step S123] If the access controller 220 has received a read request from the host apparatus 400 (Yes to the step S122), the access controller 220 determines whether or not location information on a data area from which data is requested to be read out is registered in the bad data management table 260. If the corresponding location information is not registered in the bad data management table 260 (No to the step S123), the access controller 220 executes a step S124. On the other hand, if corresponding location information is registered in the bad data management table 260 (Yes to the step S123), the access controller 220 executes a step S125.

[Step S124] The access controller 220 reads out the data requested to be read out from the HDD, and sends the read data to the host apparatus 400 as a response. That is, the access controller 220 normally responds to the host apparatus 400.

[Step S125] The access controller 220 sends an error response to the host apparatus 400 since the requested data has not been normally read out.

Note that if the access controller 220 has received a read request from the host apparatus 400 (Yes to the step S122), the access controller 220 may execute reading of the data without referring to the bad data management table 260. In this case, the access controller 220 executes the step S124 if the data has been successfully read out, whereas the access controller 220 executes the step S125 if the data has not been successfully read out. However, when location information of the data to be read is registered in the bad data management table 260, there is a high possibility that reading of the data is not normally executed. Therefore, by referring to the bad data management table 260, it is possible to prevent unnecessary data access from being executed by the access controller 220.

[Step S126] If the access controller 220 has received a write request from the host apparatus 400 (No to the step S122), the access controller 220 determines whether or not the hot spare HDD is ready for being used for rebuilding the data. More specifically, when in the record 251 of the RLU #00 in the RAID management table 250, the "HS disk number" has been set to the disk number of the hot spare HDD and the "RAID status" has been set to "rebuild in progress", the access controller 220 determines that the hot spare HDD has been made ready for use.

If the hot spare HDD has been made ready for use (Yes to the step S126), the access controller 220 executes a step S127. On the other hand, if the hot spare HDD has not been made ready for use (No to the step S126), the access controller 220 executes a step S128.

[Step S127] The access controller 220 performs write processing for a predetermined HDD belonging to the RLU "00, which is not faulty. Further, if there is data to be written into the faulty HDD, the access controller 220 writes the data into the hot spare HDD.

The details of the write processing executed in the step S127 is as described in the "state 12" in FIG. 11. If the data has been written into the hot spare HDD, an error detection code based on the data written into the block is overwritten in the BCC corresponding to the block into which the data has been written. This makes it possible to normally read out the data written in the block, and enables the salvage controller 240 to recognize, during the salvage process, the fact that host-writing of data with respect to the LBA corresponding to the block was executed during the rebuild process.

For example, in the step S127, even when writing of data into the HDD which is not faulty has not been normally performed, data which makes it possible to salvage the data which has not been written is written into the hot spare HDD. Therefore, even when the data is not successfully read out, during subsequent the rebuild process, from a location into which the data has not been successfully written, the salvage controller 240 is enabled to salvage the data which has not been successfully read out at least based on the data written into the hot spare HDD.

[Step S128] The access controller 220 performs write processing for the predetermined HDD belonging to the RLU #00, which is not faulty.

[Step S129] The access controller 220 registers the location information indicative of a location where the data has been written (LUN and LBA associated with the block into which the data has been written) in the non-redundant write management table 270.

The details of the steps S128 and S129 are as described in the "state 21" in FIG. 13. By execution of the step S129, location information on data having no redundancy, out of the data recorded in the RLU #00, is registered in the non-redundant write management table 270.

Figure 18:
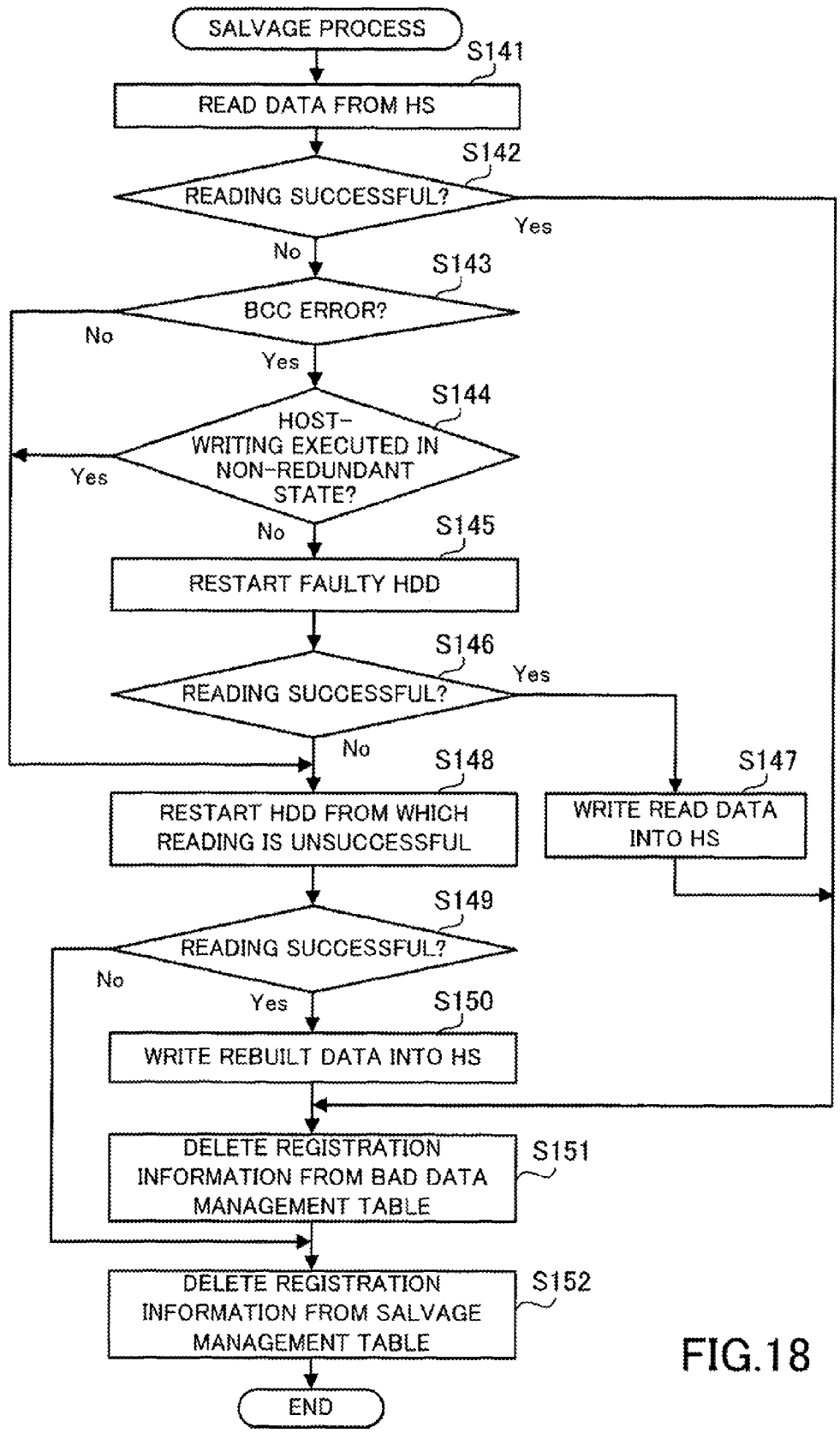
FIG. 18 illustrates an example of a salvage process.

Next, FIG. 18 illustrates an example of the salvage process. The process in FIG. 18 is executed whenever the salvage controller 240 selects one item of the location information registered in the salvage management table 280. Further, the salvage controller 240 identifies, based on the RAID management table 250, an RLU for which is set a LUN in the location information selected from the salvage management table 280. The following process will be described assuming that the RLU #00 has been identified.

[Step S141] The salvage controller 240 recognizes a hot spare HDD (assumed to be the DISK #10 in the present example) from the "HS disk number" in the record 251 of the RLU #00 in the RAID management table 250. The salvage controller 240 attempts to read out data from a block on the hot spare HDD, which is identified from the location information, by the same processing as the step S25 in the "state 13" in FIG. 12. In a case where the RLU #00 is at RAID 1, the location from which data is read out in this step is a block on the hot spare HDD where is stored the same data as the data stored in the block from which the data reading was unsuccessful, whereas in a case where the RLU #00 is at either RAID 4 or RAID 5, it is a block on the hot spare HDD, corresponding to the same stripe number as that of the block from which data reading was unsuccessful.

[Step S142] If the data reading in the step S141 is successful (Yes to the step S142), the salvage controller 240 executes a step S151. In this case, the salvaging of data is successful. On the other hand, if the data reading in the step S141 is not successful (No to the step S142), the salvage controller 240 executes a step S143.

If the data has been successfully salvaged, the salvage controller 240 may further perform, for example, writing of data also into a corresponding block on the HDD from which data reading was unsuccessful (i.e. block from which data reading was unsuccessful during the rebuild process). When the RLU #00 is at RAID 1, the salvage controller 240 writes the data read out from the hot spare DISK #10 into the corresponding block on the HDD from which the data reading was unsuccessful. On the other hand, when the RLU #00 is at either RAID 4 or RAID 5, the salvage controller 240 reads out the data in a block of the same stripe number as that of the block from which the data reading was unsuccessful from each of the other non-faulty ones of the HDDs belonging to the RLU #00 than the HDD from which the data reading was unsuccessful. The salvage controller 240 calculates the data which has not been successfully read out based on these read data and the data read out from the hot spare DISK #10, and writes the calculated data into the block of the same stripe number on the HDD from which the data reading was unsuccessful.

[Step S143] If a BCC error is detected in the data reading in the step S141 (Yes to the step S143), a step S144 is executed. On the other hand, if the data reading in the step S141 was unsuccessful due to a cause other than a BCC error (No to the step S143), a step S148 is executed. Note that examples of the latter case include a case where the hot spare DISK #10 is faulty.

[Step S144] The salvage controller 240 determines whether or not host-writing of data in the non-redundant state has been executed for the RLU #00 during a time period after the HDD in the RLU #00 has failed and before the hot spare DISK #10 is ready for use. More specifically, the salvage controller 240 determines whether or not the LUN and LBA in the location information selected from the salvage management table 280 are registered in the non-redundant write management table 270. This determination processing corresponds to the determination processing described in the step S34 in the "state 22" in FIG. 14 and the step S42 in the "state 31" in FIG. 15.

If the same LUN and LBA are registered in the non-redundant write management table 270 (Yes to the step S144), the salvage controller 240 executes the step S148. On the other hand, if the same LUN and LBA are not registered in the non-redundant write management table 270 (No to the step S144), the salvage controller 240 executes a step S145.

[Step S145] If host-writing of data has not been executed for the RLU #00 after the HDD belonging to the RLU #00 has failed and until now (No to the step S142, and Yes to a step S146), it is presumed that the latest data for generating rebuilt data is stored neither in the hot spare DISK #10 nor in the HDD from which the data read was unsuccessful. Then, as illustrated in the "states 22 and 23" in FIG. 14, the salvage controller 240 attempts to read out the data from the faulty HDD.

The salvage controller 240 recognizes the faulty HDD from the record 251 of the RLU #00 in the RAID management table 250, and switches off and then on the power of the faulty HDD to thereby restart the faulty HDD. This processing corresponds to the step S35 in the "state 22" in FIG. 14. Not that if the power of the faulty HDD has been already switched off, the salvage controller 240 restarts the HDD by simply switching the power on.

[Step S146] The salvage controller 240 reads out the data from a block identified from location information on the restarted HDD (i.e. a block on the faulty HDD, corresponding to the block from which the data reading was unsuccessful). In the case where the RLU #00 is at RAID 1, the location from which data is read out in this step is a block on the faulty HDD where is stored the same data as the data stored in the block from which the data reading was unsuccessful, whereas in the case where the RLU #00 is at either RAID 4 or RAID 5, it is a block on the faulty HDD, corresponding to the same stripe number of the block from which the data reading was unsuccessful.

If the data has been successfully read out (Yes to the step S146), the salvage controller 240 executes a step S147, whereas if the data has not been successfully read out (No to the step S146), the salvage controller 240 executes the step S148.

For example, if the power of the faulty HDD is on at the step S145, the salvage controller 240 may read out the data from the faulty HDD before restarting the faulty HDD. In this case, if the data has been successfully read out, the salvage controller 240 executes the step S147. On the other hand, if the data has not been successfully read out, the salvage controller 240 restarts the faulty HDD, and then determines whether or not the data has been successfully read out by executing the steps S145 and S146.

[Step S147] The salvage controller 240 writes the data read from the HDD restarted in the step S146 into a block on the hot spare DISK #10, corresponding to the block from which the data has been read out. As a consequence, the data is successfully salvaged. The above-mentioned steps S146 (in the case of Yes) and S147 correspond to the step S36 in the "state 23" in FIG. 14. Thereafter, the step S151 is executed.

In the step S147, the salvage controller 240 may further write data also into a corresponding block on the HDD from which data reading was unsuccessful (i.e. a block from which data reading was unsuccessful during the rebuild process). When the RLU #00 is at RAID 1, the salvage controller 240 writes the data read from the restarted HDD into a corresponding block on the HDD from which data reading was unsuccessful. On the other hand, when the RLU #00 is at either RAID 4 or RAID 5, the salvage controller 240 reads out the data in the block of the same stripe number as the block from which the data reading was unsuccessful, from the other non-faulty HDDs belonging to the RLU #00 than the HDD from which data reading was unsuccessful. The salvage controller 240 calculates the data which has not been successfully read out based on these read data and the data read from the restarted HDD, and writes the calculated data into the block of the same stripe number on the HDD from which data reading was unsuccessful.

Further, it is desirable that after completion of the step S147, the salvage controller 240 switches off the operation of the HDD restarted in the step S145, and separates the HDD from the RLU #00. This is because the HDD restarted in the step S145 was once determined to be faulty, and hence has a low possibility of stably operating thereafter.

[Step S148] If execution of host-writing of data is registered in the non-redundant write management table 270 (Yes to the step S144), this indicates that the latest data had been written only into the block from which the data reading was unsuccessful by the host-writing operation before then. Therefore, as illustrated in the "states 31 and 32" in FIG. 15, the salvage controller 240 attempts to read out data from the HDD to which belongs the block from which the data reading was unsuccessful.

The salvage controller 240 recognizes the HDD from which data reading was unsuccessful from the disk number in the location information selected from the salvage management table 280, and switches off and then on the power of the HDD, to thereby restart the HDD. This processing corresponds to the step S43 in the "state 31" in FIG. 15.

When the RLU #00 is at RAID 1, the salvage controller 240 recognizes the HDD from which data reading was unsuccessful even without using the disk number registered in the salvage management table 280. This is because when in the case of RAID 1, it is easily determined that a HDD from which data reading was unsuccessful is the non-faulty one of the HDDs belonging to the RLU #00.

[Step S149] The salvage controller 240 reads out the data from a block identified from location information on the restarted HDD (i.e. a block from which the data reading was unsuccessful). If the data has been successfully read out (Yes to the step S149), the salvage controller 240 executes a step S150, whereas if the data has not been successfully read out (No to the step S149), the salvage controller 240 executes a step S152.

[Step S150] The salvage controller 240 generates rebuilt data based on data read out from at least the restarted HDD, and writes the generated rebuilt data into a corresponding block on the hot spare DISK #10.

As described in the step S44 in the "state 32" in FIG. 15, when the RLU #00 is at RAID 1, the salvage controller 240 writes the data read from the restarted HDD into a corresponding block on the hot spare DISK #10 (block into which the same data is to be stored). Further, when the RLU #00 is managed by RAID 4 or RAI-5, the salvage controller 240 reads out data from the restarted HDD and the respective same stripe numbers in the rest of the HDDs belonging to the RLU #00, which are not faulty, and calculates rebuilt data to be stored in the hot spare DISK #10, based on the read data. The salvage controller 240 writes the calculated rebuilt data into a block corresponding to the same stripe number in the hot spare DISK #10. By executing the above-described processing, the salvaging of data becomes successful.

[Step S151] Since the data has been successfully salvaged, the salvage controller 240 deletes the record in the bad data management table 260, in which the same LUN and LBA as the location information selected from the salvage management table 280 are registered.

[Step S152] The salvage controller 240 deletes the location information selected from the salvage management table 280 (LUN, LBA, and the disk number) from the salvage management table 280.

Note that if it was impossible to salvage the data using any of the salvaging methods (1) to (3) (No to the step S149), the location information registered in the salvage management table 280 is deleted (S152), but the location information registered in the bad data management table 260 remains undeleted. When performing host-reading of data after completion of the rebuild process, if an object to be read out corresponds to a location registered in the bad data management table 260, the access controller 220 sends an error response to the host apparatus 400. This enables the access controller 220 to respond to the host apparatus 400 without unnecessarily accessing the HDD, when a read request for lost data is received.

If it was impossible to salvage the data (No to the step S149), instead of leaving the location information undeleted from the bad data management table 260, the salvage controller 240, for example, may write information indicative of bad data for the BCC of a block on the hot spare HDD identified by the location information (i.e. a block on the hot spare HDD, corresponding to the block from which the data reading was unsuccessful). The "bad data" indicates, for example, that the data in the corresponding block is lost. In this case, when a read request for the data which has not been salvaged after the rebuild process, the access controller 220 clearly recognizes from the BCC of the corresponding block in the hot spare DISK #10 that the data is lost.

According to the above-described processes in FIGS. 16 to 18, even when data has not been successfully read out during the rebuild process, it is possible to prevent the data from being lost as much as possible. Therefore, it is possible to enhance the reliability of the storage system.

In the process in FIG. 18, the salvaging method (1) out of the salvaging methods (1) to (3) is executed first (step S141). This makes it possible to minimize the influence of load of the salvage process on processing of host-writing and host-reading for the RLU #00 to be salvaged.

Further, in the process in FIG. 18, for example, the salvaging method (2) (steps S145 and S146) and the salvaging method (3) (steps S148 and S149) may be executed in the mentioned order without executing the determination processing in the steps S143 and S144. In this case, the non-redundant write management table 270 becomes unnecessary, whereby it is possible to reduce the storage capacity of the CM 201.

Further, the salvaging method (2) restarts a HDD which is not used for host-reading and host-writing data due to a failure. On the other hand, the salvaging method (3) restarts a HDD for use in host-reading and host-writing, and hence a response to the host apparatus 400 is suspended until the operation of the HDD is started again. From this fact, by executing the process using the salvaging method (2) before the process using the salvaging method (3), it is possible to reduce the influence on processing for host-writing and host-reading, and prevent the speed of response to the host apparatus 400 from being reduced as much as possible.

In the above-described second embodiment, the salvage process is executed asynchronously with the timing in which the data reading was unsuccessful during the rebuild process. However, as another example, when the data reading was unsuccessful, the rebuild process may be interrupted to immediately execute the salvage process. For example, if it is determined in the step S104 in FIG. 16 that the data reading is unsuccessful (Yes to the step S104), the location information is registered in the bad data management table 260 (S106 in FIG. 16), and the process in FIG. 18 is executed. However, in a case where the salvage process is executed when the data reading is successful, it is unnecessary to register the data in the salvage management table 280 (S106 in FIG. 16), and hence the step S152 in FIG. 18 need not be executed either.

Further, in the above-described second embodiment, when the data reading is unsuccessful during the rebuild process, the location information is immediately registered in the bad data management table 260. However, as another processing example, the location information may not be registered in the bad data management table 260 when the data reading is unsuccessful, but the salvage controller 240 may register the location information in the bad data management table 260 when it is determined that it is impossible to salvage the data (No to the step S149 in FIG. 18). In this case, when a read request to the RLU #00 being subjected to the rebuild process is received from the host apparatus 400, even if the location from which data is requested to be read out is the location from which the data reading was unsuccessful during the rebuild process, the access controller 220 once attempts to read the data from the HDD.

(c) Third Embodiment

In the above-described second embodiment, after the rebuild process for an RLU has been started, when the access controller 220 receives a read request for the RLU from the host apparatus 400, the access controller 220 unconditionally sends an error response to the host apparatus 400 in a case where an object to be read out is registered in the bad data management table 260. On the other hand, in the third embodiment described hereafter, the access controller 220 reads out data from a HDD in response to a read request from the host apparatus 400, and if the data reading is unsuccessful, the access controller 220 causes the salvage controller 240 to execute processing for salvaging the data. This increases the possibility of sending the data requested from the host apparatus 400 as a response even when a HDD failure has occurred.

Note that in a storage system according to the third embodiment, the hardware configuration and the basic configuration of processing functions of the CM are the same as those of the CM 201 according to the second embodiment. Therefore, hereinafter, processing executed by the CM 201 according to the third embodiment will be described using the reference numerals appearing in FIG. 4 of the second embodiment.

Figure 19:
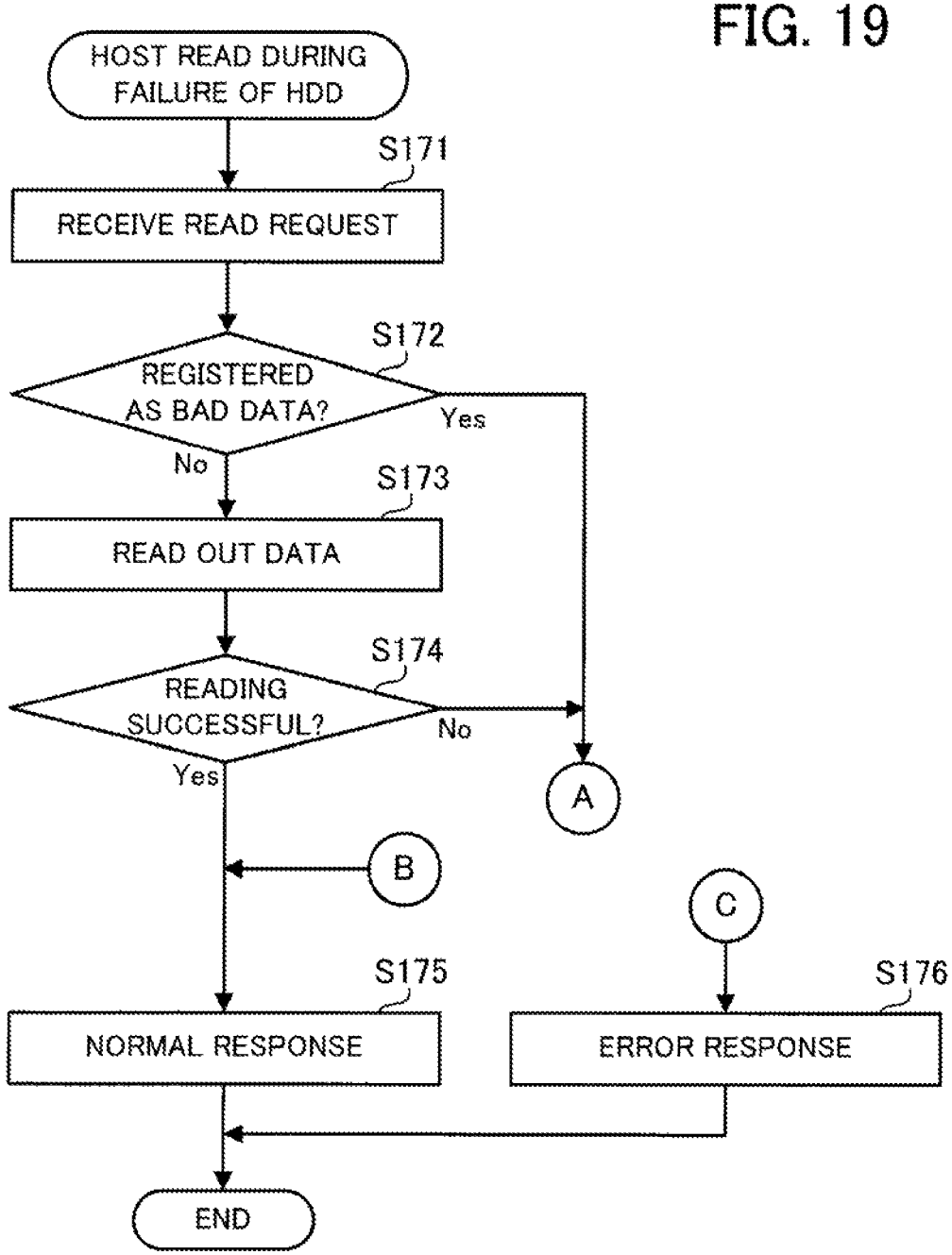
FIG. 19 is a flowchart (1) of an example of a host read process executed by a controller module according to a third embodiment.
Figure 20:
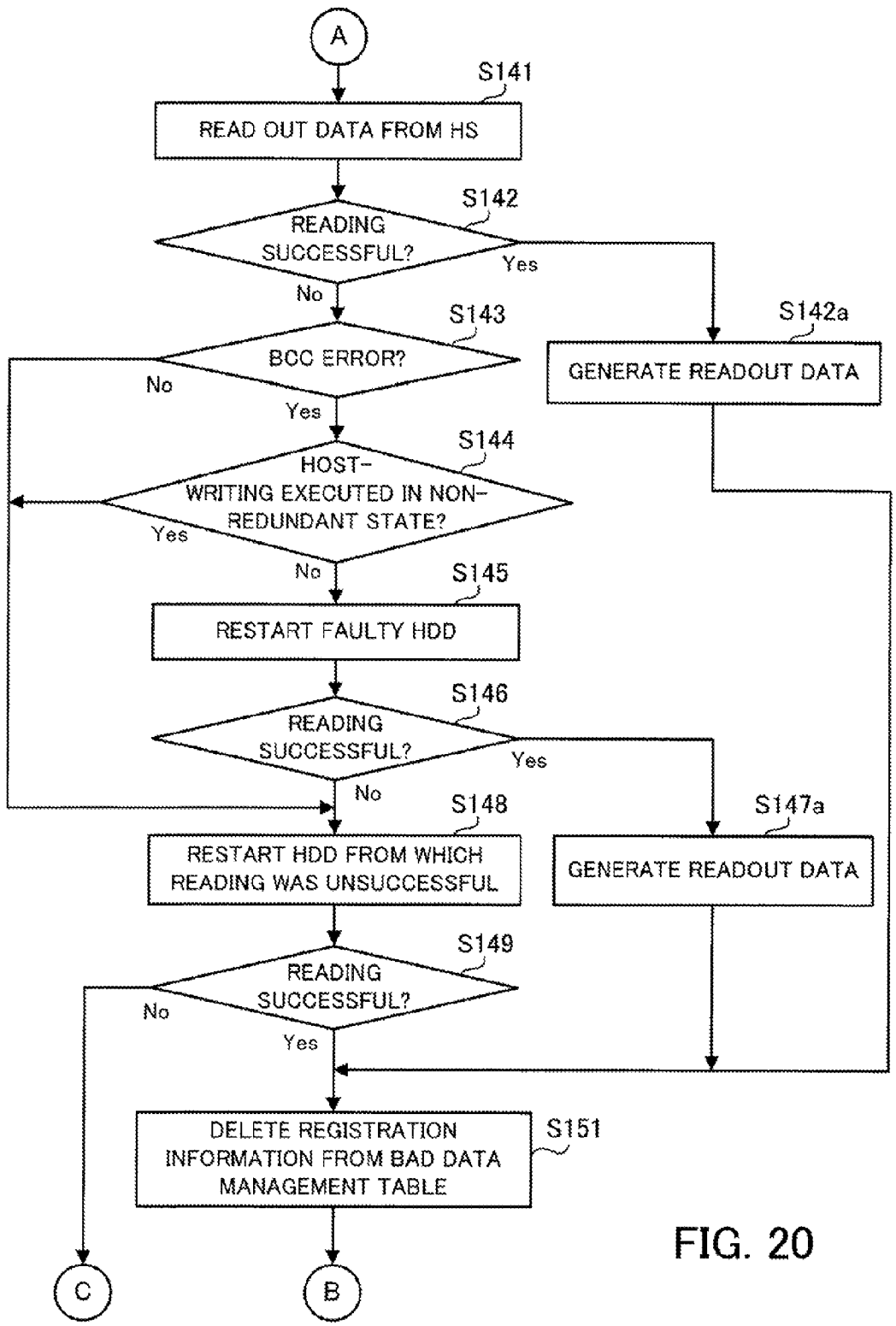
FIG. 20 is a flowchart (2) of an example of the host read process executed by the controller module according to the third embodiment.

FIGS. 19 and 20 are flowcharts of a host-read process executed in the CM according to the third embodiment.

First, steps S171 to S176 in FIG. 19 will be described.

[Step S171] In this step, for example, it is assumed that one of the HDDs belonging to the RLU #00 has failed. In this state, upon receipt of a read request for reading out data from the RLU #00 from the host apparatus 400, the access controller 220 executes the next step S172.

[Step S172] The access controller 220 determines whether or not location information on a data area from which the data is requested to be read out is registered in the bad data management table 260. If the corresponding location information is not registered in the bad data management table 260 (No to the step S172), the access controller 220 executes the step S173.

On the other hand, if the corresponding location information is registered in the bad data management table 260 (Yes to the step S172), the access controller 220 notifies the salvage controller 240 of the corresponding location information, and requests the salvage controller 240 to execute the salvage process. The salvage controller 240 executes the step S141 in FIG. 20 in response to the execution request.

[Step S173] The access controller 220 reads out the data requested to be read out from the HDD.

[Step S174] If the data has been successfully read out (Yes to the step S174), the access controller 220 executes the step S175. On the other hand, if the data has not been successfully read out (No to the step S174), the access controller 220 notifies the salvage controller 240 of the location information on the data which has not been successfully read out, and requests the salvage controller 240 to execute the salvage process. The salvage controller 240 executes the step S141 in FIG. 20 in response to the execution request.

[Step S175] The access controller 220 sends the data read out from the HDD in the step S173 to the host apparatus 400 as a response. That is, the access controller 220 normally responds to the host apparatus 400.

[Step S176] The access controller 220 sends an error response to the host apparatus 400 since the requested data has not been normally read out.

Next, a process in FIG. 20 will be described. In FIG. 20, the steps in which the same processing as in FIG. 18 is executed are denoted by the same step numbers, and detailed description thereof is omitted.

The salvage controller 240 having received the salvage process request from the access controller 220 attempts to read out the data from the hot spare HDD using the above-described salvaging method (1) (S141). If the data has been successfully read from the hot spare HDD (Yes to the step S142), the salvage controller 240 executes a step S142*a*.

[Step S142*a*] The salvage controller 240 generates readout data to be sent to the host apparatus 400 as a response based on the data read out from the hot spare HDD. When the RLU #00 is managed by RAID 1, the readout data is the same as the data read out from the hot spare HDD. On the other hand, when the RLU #00 is at RAID 4 or RAID 5, the salvage controller 240 generates readout data by calculation based on the data read out from the hot spare HDD and the data read out from non-faulty ones of the HDDs belonging to the RLU #00 except the HDD from which the data reading was unsuccessful.

On the other hand, if the data has not been successfully read out from the hot spare HDD (No to the step S142), the cause of the unsuccessful reading is a BCC error (Yes to the step S143), and the corresponding location information is not registered in the non-redundant write management table 270 (No to the step S144), the salvage controller 240 executes processing using the above-described salvaging method (2). That is, the salvage controller 240 restarts the faulty HDD (S145), and attempts to read the data from the restarted HDD. If the data has been successfully read out from the restarted HDD (Yes to the step S146), the salvage controller 240 executes a step S147*a*.

[Step 147*a*] The salvage controller 240 generates readout data to be sent to the host apparatus 400 as a response based on the data read from the HDD restarted in the step S145. When the RLU #00 is at RAID 1, the readout data is the same as the data read out from the restarted HDD. On the other hand, when the RLU #00 is at either RAID 4 or RAID 5, the salvage controller 240 generates the readout data by calculation based on the data read out from the restarted HDD and the data read out from non-faulty ones of the HDDs belonging to the RLU #00, except the HDD from which the data reading was unsuccessful.

Further, if the unsuccessful reading of the data from the hot spare HDD is due to a cause other than a BCC error (No to the step S143), or the corresponding location information is registered in the non-redundant write management table 270 (Yes to the step S144), or the data reading from the HDD restarted after having failed is unsuccessful (No to the step S146), the salvage controller 240 executes processing using the above-described salvaging method (3). That is, the salvage controller 240 restarts the HDD from which the data reading was unsuccessful (S148), and attempts to read out the data from the restarted HDD.

In this step, if the data has not been successfully read out from the restarted HDD (No to the step S149), the salvage controller 240 notifies the access controller 220 of the failure in salvaging the data. The access controller 220 having received the notification of failure in the salvaging sends an error response to the host apparatus 400 (S176 in FIG. 19).

On the other hand, if the data has been successfully read out in the step S148 (Yes to the step S149), or after executing the step S142*a* or S147*a*, the salvage controller 240 deletes the location information associated with the data to be salvaged, which is registered in the bad data management table 260, from the bad data management table 260 (S151). Thereafter, the salvage controller 240 notifies the access controller 220 of success in the salvaging, and passes the readout data generated in the step S142*a* or S147*a*, or the data read out from the HDD restarted in the step S148 to the access controller 220. The access controller 220 sends the data received from the salvage controller 240 to the host apparatus 400 as a response (S175 in FIG. 19).

According to the above-described third embodiment, not only during the rebuild process, but also when a HDD failure has occurred and data reading in response to a read request from the host apparatus 400 is unsuccessful, the salvage process is executed. Therefore, it is possible to increase possibility of normally executing host-reading of data when a HDD failure occurs.

(d) Fourth Embodiment

In the salvaging method (2) described in the above-described second embodiment, it is determined whether or not host-writing of data has been executed during a time period after a HDD belonging to an RLU has failed and until now, and if host-writing of data has not been executed, the faulty HDD is restarted and data is read out from the restarted HDD. In the salvaging method (2), the above-mentioned determination is performed by performing two determinations of whether or not it is possible to read out the data from the hot spare HDD (S142 in FIG. 18), and whether or not the corresponding location information is registered in the non-redundant write management table 270 (S144 in FIG. 18).

On the other hand, in the salvage process according to the fourth embodiment described hereafter, it is determined using a write management table whether or not host-writing of data has been executed during a time period after a HDD belonging to an RLU has failed and until now. Then, if it is determined based on the write management table that host-writing of data has not been executed, the faulty HDD is restarted, and the data is read out from the restarted HDD. Hereinafter, the above-described salvaging method based on the write management table is referred to as the salvaging method (2*a*).

Figure 21:
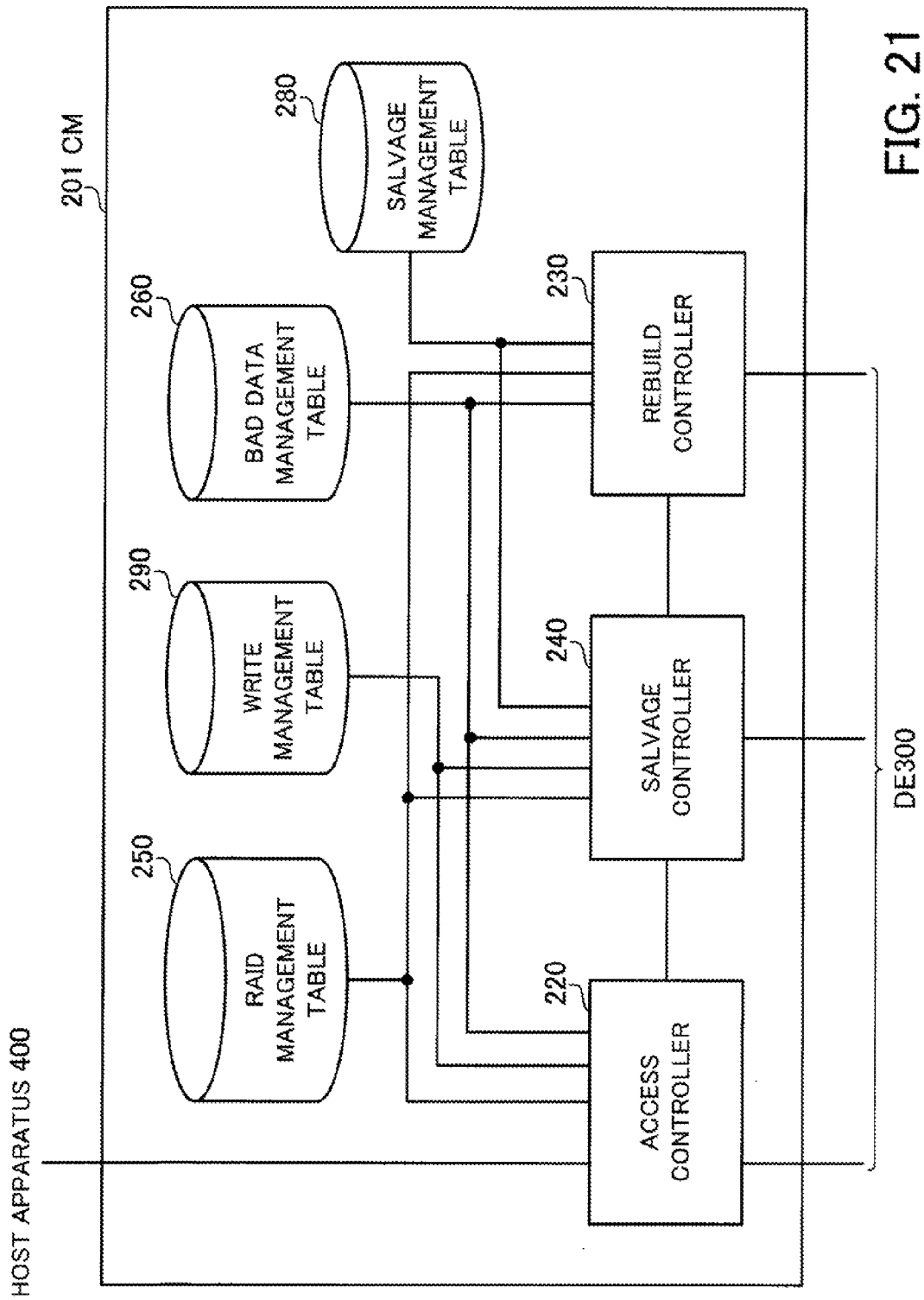
FIG. 21 is a block diagram of an example of the configuration of processing functions of a controller module according to a fourth embodiment.

FIG. 21 is a block diagram of an example of the configuration of processing functions of a CM according to the fourth embodiment. In FIG. 21, processing blocks corresponding to those in FIG. 4 are denoted by the same reference numerals.

In the fourth embodiment, the storage device of the CM 201 stores a write management table 290 in place of the non-redundant write management table 270. In the write management table 290, there is registered location information indicative of a writing location where host-writing of data has been executed for the RLU during a time period after a HDD belonging to the RLU has failed and before the rebuild process is completed.

During a time period after one of the HDDs belonging to the RLU has failed and the redundancy of the data recorded in the RLU is lost and before the rebuild process for a hot spare HDD is completed, when host-writing of data is executed for the RLU, the access controller 220 registers location information indicative of a location where the data has been written, in the write management table 290.

The salvage controller 240 refers to the write management table 290 in the salvage process, and determines a procedure of the salvage process depending on whether or not the location information associated with the data to be salvaged is registered in the write management table 290.

Figure 22:
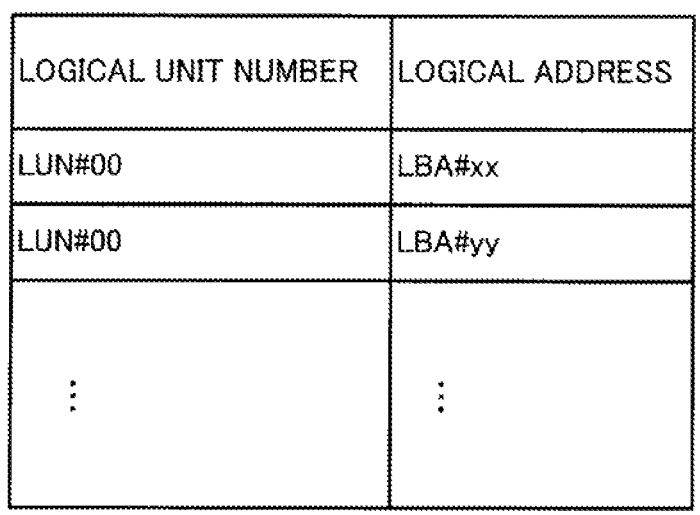
FIG. 22 illustrates an example of information registered in a write management table.

FIG. 22 illustrates an example of information registered in the write management table.

When the RAID status of the RLU is in the "non-redundant" status or the "rebuild in progress" status, if host-writing of data is executed for a logical unit which belongs to the RLU, information indicative of a location where the data has been written is registered in the write management table 290, as a combination of a LUN and an LBA.

The data structure of the write management table 290 is not limited to the example illustrated in FIG. 22. For example, the write management table 290 may be configured such that flag information indicative of whether or not host-writing of data in the "non-redundant" or "rebuild in progress" status has been executed is associated with each of all LBAs of each logical unit. Further, in the write management table 290, there may be registered as the location information, for example, a disk number of each HDD and physical addresses in the HDD, in place of the LUN and LBA.

Figure 23:
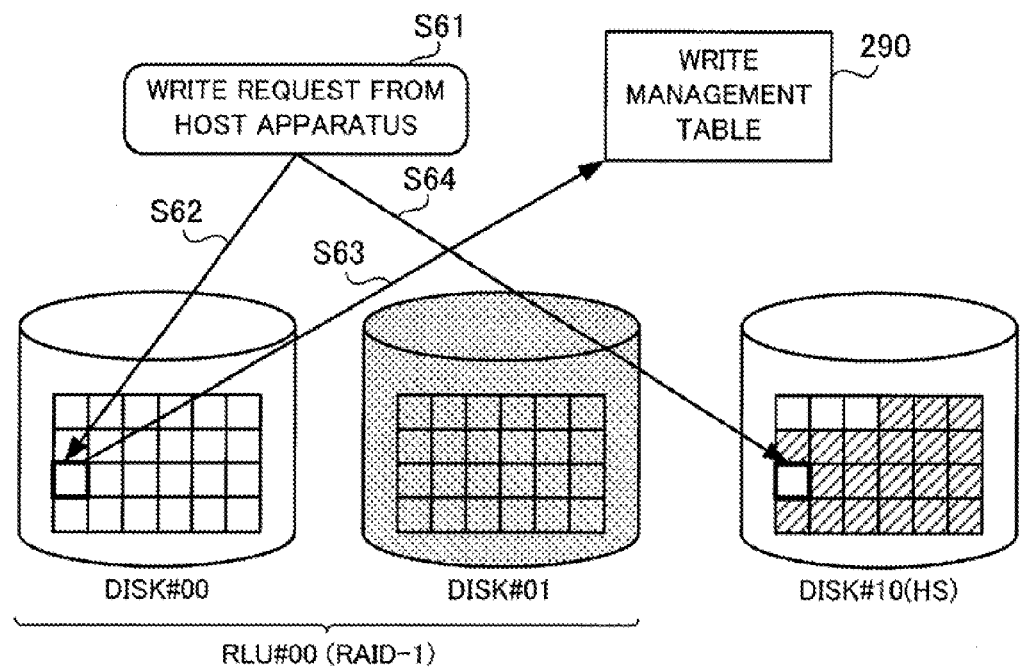
FIG. 23 illustrates preprocessing for execution of a salvaging method (2a)

Next, a description will be given of the salvage process executed in the fourth embodiment. FIG. 23 illustrates preprocessing for execution of the salvaging method (2a).

A "state 41" in FIG. 23 indicates a case where the DISK #01 constituting the RLU #00 has failed, similarly to the "state 1" in FIG. 10. However, the "state 41" indicates a state during a time period after the DISK #01 has failed and before the rebuild process for the hot spare DISK #10 is completed. This time period includes a time period until the hot spare DISK #10 where data is to be rebuilt is made ready for use, as indicated in the "state 21" in FIG. 13.

As preprocessing of the salvaging method (2a), upon receipt of a write request for writing data into the RLU #00 in the "state 41" from the host apparatus 400 (step S61), the access controller 220 writes the data into a corresponding block on the DISK #00 (step S62). Also, the access controller 220 registers the location information indicative of the location where the data has been written (LUN and LBA associated with the block where the data has been written) in the write management table 290 (step S63). The procedure in the step S63 is similarly executed in a case where the RLU #00 is at RAID 4 or RAID 5, and the access controller 220 registers the information on the location where host-writing of data has been executed in the non-redundant write management table 270.

If the hot spare DISK #10 has been made ready for use, the access controller 220 may execute host-writing of data not only for the DISK #00 but also for the DISK #10 where data is to be rebuilt, similarly to the step S23 indicated in the "state 12" in FIG. 11 (step S64). For example, when the RLU #00 is at RAID 1, in the step S64, the access controller 220 writes the data requested to be written from the host apparatus 400 also into the DISK #10. Note that the step S64 executed when the RLU #00 is at RAID 4 or RAID 5 is the same as the processing described in the step S23 in FIG. 11. By executing the step S64, it is possible to use the above-described salvaging method (1) in combination.

Figure 24:
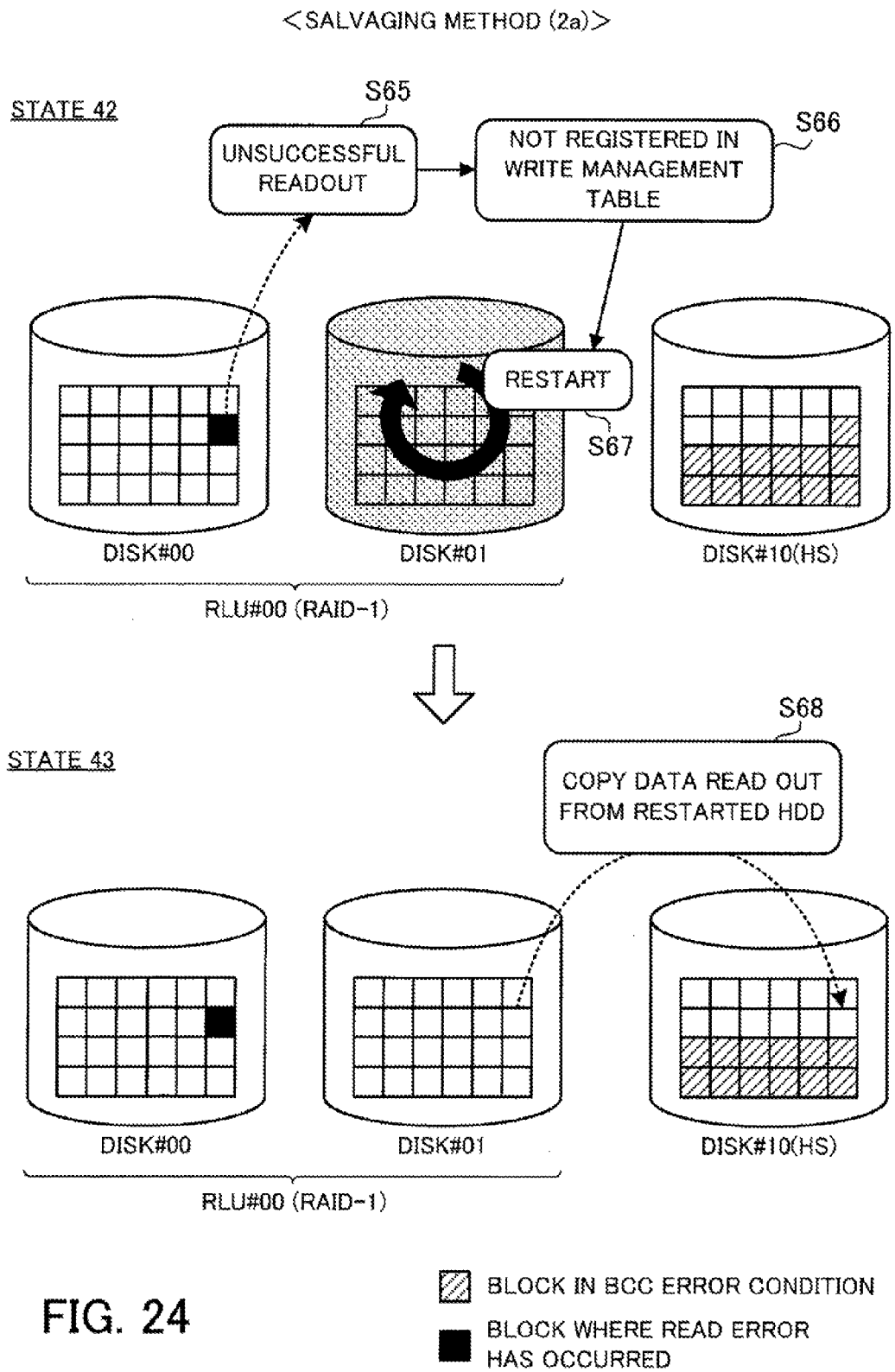
FIG. 24 illustrates the salvaging method (2a)

FIG. 24 illustrates the salvaging method (2a).

A "state 42" in FIG. 24 indicates a state in which the rebuild process is being executed for the hot spare DISK #10 in the "state 41" in FIG. 23. When the RLU #00 is at RAID 1, the rebuild controller 230 reads out data from the RLU #00, which is recorded in the DISK #00, and copies the read data into the DISK #10. It is assumed here that during the rebuild process as mentioned above, the rebuild controller 230 has failed in reading the data from the DISK #00 (step S65).

The salvage controller 240 determines whether or not host-writing of data has been executed for the RLU #00 after the DISK #01 has failed and until now. If host-writing of data has been executed during this time period, the latest data has been recorded in at least one of a block on the DISK #00 from which data reading was unsuccessful and a block on the DISK #10, which corresponds to the block.

The salvage controller 240 performs the above-mentioned determination processing depending on whether or not the location information corresponding to the block from which the data reading was unsuccessful is registered in the write management table 290. If the above-mentioned location information is not registered, the salvage controller 240 determines that host-writing of data has not been executed for the RLU #00 during the time period after the DISK #01 has failed and until now (step S66). In this case, there is a high possibility that the data to be rebuilt in the hot spare DISK #10, corresponding to the data which has not been successfully read out from the DISK #00, exists only in the faulty DISK #01. Therefore, the salvage controller 240 restarts the faulty DISK #01 (step S67), and attempts to read out the data to be rebuilt in the DISK #10 from the restarted DISK #01.

As illustrated in a "state 43" in FIG. 24, the salvage controller 240 reads out the data from the block on the restarted DISK #01, corresponding to the block on the DISK #00 from which the data reading was unsuccessful. If the data has been successfully read out, the salvage controller 240 copies the read data into a corresponding block on the hot spare DISK #10. In this case, the salvaging of data is successful (step S68).

Note that the salvaging method (2a) illustrated in FIG. 24 is similarly executed in the case where the RLU #00 is at either RAID 4 or RAID 5. That is, when the data has been successfully read out from the corresponding block on the restarted DISK #01, the salvage controller 240 copies the read data into a block on the hot spare DISK #10, corresponding to the same stripe number.

Next, a description will be given of an example of the salvage process as a combination of the above-described salvaging method (2a) and the salvaging methods (1) and (3) with reference to flowcharts.

Figure 25:
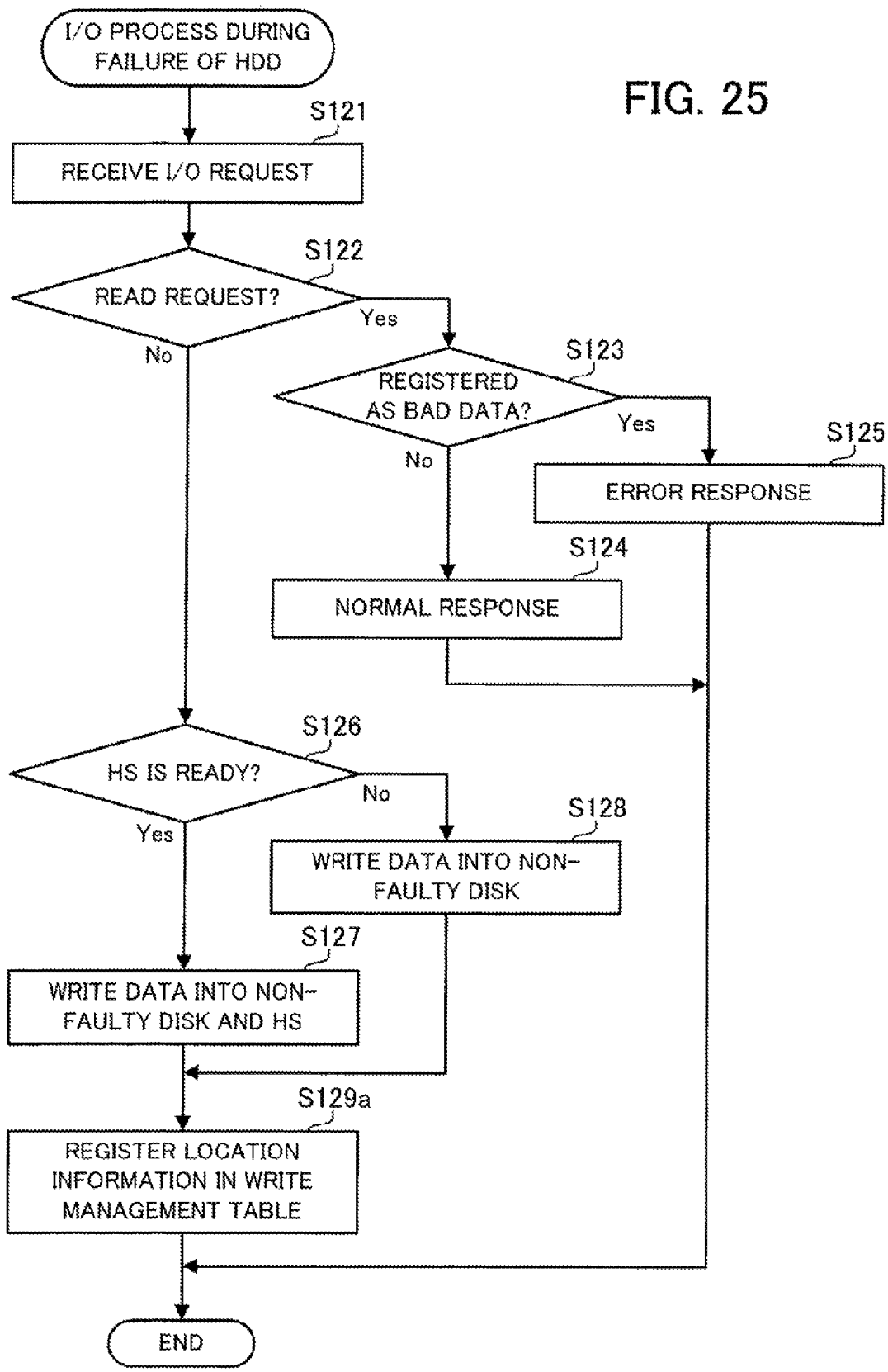
FIG. 25 is a flowchart of an example of an I/O process executed in the fourth embodiment.

FIG. 25 is a flowchart of an example of an I/O process executed in the fourth embodiment. FIG. 25 illustrates the I/O process executed during a time period after one of the HDDs belonging to the RLU #00 to be subjected to the I/O process has failed and before the rebuild process for the RLU #00 is completed. This time period is a time period during which the "disk status" is "faulty" and the "RAID status" is "non-redundant" or the "rebuild in progress", in the record 251 of the RLU #00 in the RAID management table 250.

Note that in FIG. 25, the steps in which the same processing as in FIG. 17 is executed are denoted by the same step numbers, and detailed description thereof is omitted. FIG. 25 differs from FIG. 17 in a procedure of processing executed when a write request is received from the host apparatus 400 (the step S126 et seq.).

That is, when the access controller 220 has received a write request from the host apparatus 400 (No to the step S122), the access controller 220 determines whether or not the hot spare HDD where data is to be rebuilt is ready for use (S126). If the hot spare HDD is ready (Yes to the S126), the access controller 220 performs processing for writing data into a predetermined HDD belonging to the RLU #00, which is not faulty (S127). Further, when there is data to be written into the faulty HDD, the access controller 220 writes the data into the hot spare HDD. Thereafter, a step S129a is executed.

On the other hand, if the hot spare HDD is not ready for use (No to the S126), the access controller 220 performs processing for writing data into a predetermined HDD belonging to the RLU #00, which is not faulty (S128). Thereafter, the step S129a is executed.

[Step S129a] The access controller 220 registers location information indicative of a location or locations where the data has been written (LUN and LBA corresponding to the block(s) where the data has been written) in the write management table 290. As a consequence, information on the location(s) where host-writing of data into the RLU #00 is executed during a time period after one of the HDDs belonging to the RLU #00 has failed and before the rebuild process is completed is registered in the write management table 290.

Figure 26:
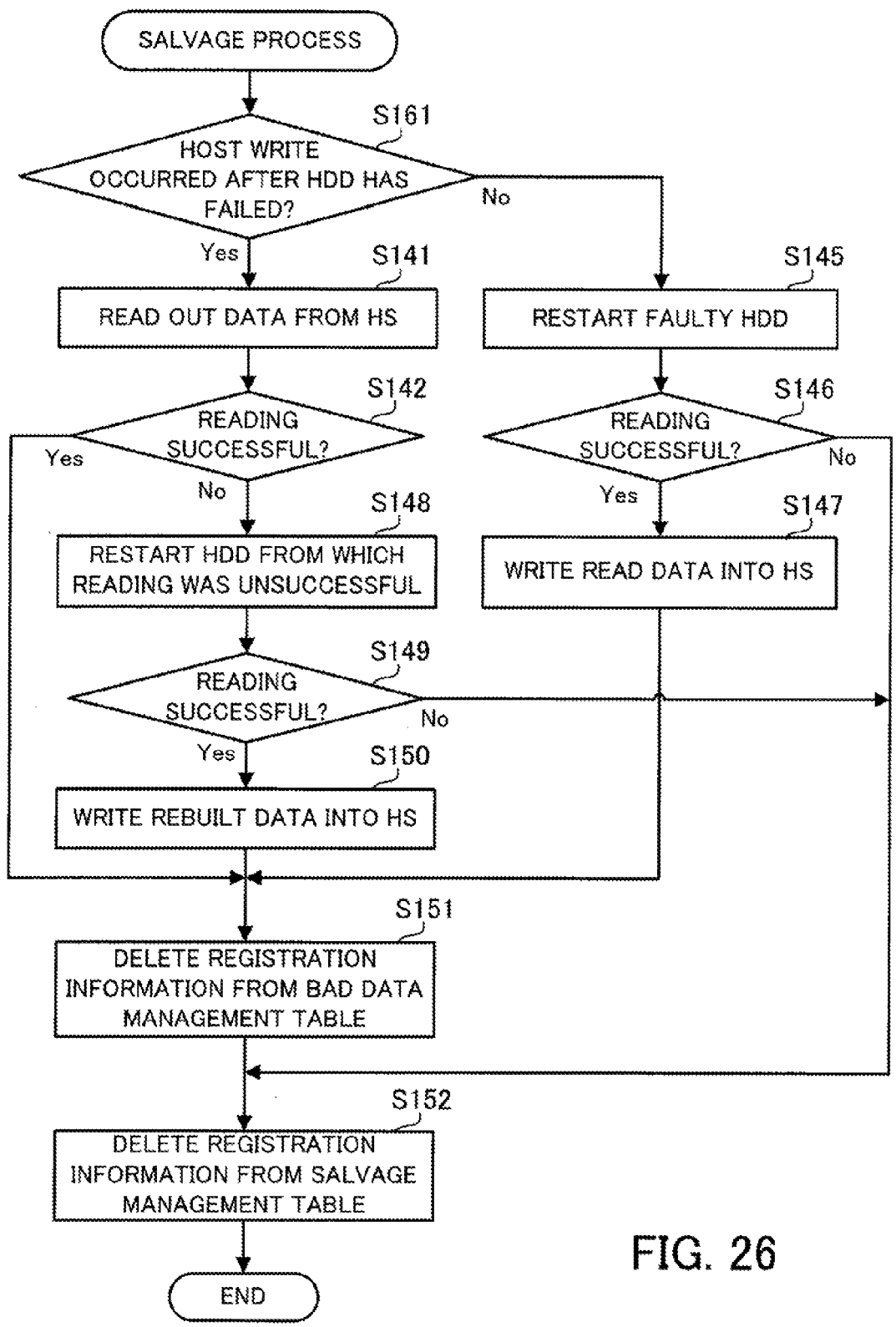
FIG. 26 is a flowchart of an example of a salvage process executed in the fourth embodiment.

FIG. 26 is a flowchart of an example of the salvage process executed in the fourth embodiment. The process in FIG. 26 is executed whenever the salvage controller 240 selects one item of the location information registered in the salvage management table 280, similarly to the process in FIG. 18. Further, the salvage controller 240 identifies the RLU which is set to the LUN in the location information selected from the salvage management table 280, based on the RAID management table 250. The following description is given assuming that the RLU #00 is identified.

In FIG. 26, the steps in which the same processing as in FIG. 18 is executed are denoted by the same step numbers, and detailed description thereof is omitted.

[Step S161] The salvage controller 240 determines whether or not host-writing of data has been executed for the RLU #00 in the non-redundant state during a time period after a HDD of the RLU #00 has failed and until now. More specifically, the salvage controller 240 determines whether or not the LUN and LBA in the location information selected from the salvage management table 280 are registered in the write management table 290.

If the same LUN and LBA are registered in the write management table 290 (Yes to the step S161), it is presumed that there is a high possibility that the latest data is recorded, by host-writing, in either the hot spare DISK #10 or the HDD from which the data read was unsuccessful. Then, the salvage controller 240 sequentially attempts to execute the salvage processing using the salvaging method (1) and the salvage processing using the salvaging method (3) in the mentioned order.

First, the salvage controller 240 reads out the data from the hot spare DISK #10 using the salvaging method (1) (S141). If the data has been successfully read out from the hot spare DISK #10 (Yes to the step S142), this means that the salvaging of data is successful, and hence the step S151 is executed.

If the data has not been successfully read out from the hot spare DISK #10 (No to the step S142), the salvage controller 240 restarts the HDD to which the block from which the data reading was unsuccessful belongs using the salvaging method (3) (S148), and attempts to read out the data from the restarted HDD (S149). If the data has been successfully read out from the restarted HDD (Yes to the step S149), the salvage controller 240 generates rebuilt data based on data read out from at least the restarted HDD, and writes the generated rebuilt data into a corresponding block in the hot spare DISK #10 (S150). Thereafter, the step S151 is executed. On the other hand, if the data has not been successfully read out from the restarted HDD (No to the step S149), this indicates that the salvaging of data is unsuccessful, and hence the step S152 is executed.

Compared with the process in FIG. 18, in the above-described steps S161 (Yes), S141, S142 (No), S148, S149 (Yes), and S150, reading of data from the HDD from which data reading was unsuccessful is executed without executing reading of data from the faulty HDD. Therefore, in a case where the data is successfully salvaged based on the data read out from the HDD from which the data reading was unsuccessful, time taken before the data is successfully salvaged is reduced.

Note that if it is determined in the step S161 that the corresponding location information is registered in the write management table 290, the step S148 may be directly executed without executing the steps S141 and S142. In this case, in FIG. 25, the steps S126 and S127 are unnecessary, and hence when the access controller 220 receives a write request (No to the step S122), the access controller 220 may unconditionally execute the steps S128 and S129a.

On the other hand, if it is determined in the step S161 that the same LUN and LBA are not registered in the write management table 290 (No to the step S161), it is presumed that the latest data is recorded neither in the hot spare DISK #10 nor in the HDD from which the data reading was unsuccessful. Therefore, the salvage controller 240 restarts the faulty HDD using the salvaging method (2a) (S145), and attempts to read out the data from the restarted HDD (S146).

If the data has been successfully read out from the restarted HDD (Yes to the step S146), the salvage controller 240 writes the read data into a block on the hot spare DISK #10, corresponding to the block from which the data has been read out (S147). As a consequence, the salvaging of data is successful, and hence the step S151 is executed. On the other hand, if the data has not been successfully read out from the restarted HDD (No to the step S146), this means that the salvaging of data is unsuccessful, and the step S152 is executed.

In the above-described steps S161 (No), S145, S146 (Yes), and S147, reading of data from the faulty HDD is executed without attempting to read out data from the hot spare DISK #10 differently from the process in FIG. 18. Therefore, time taken before data is successfully salvaged is reduced. On the other hand, if the reading of the data from the faulty HDD is unsuccessful (No to the step S146), it is determined that the salvaging of data is unsuccessful without restarting the HDD from which the data reading was unsuccessful during the rebuild process. Therefore, it is possible to reduce probability of stoppage of the I/O process for the RLU #00 executed by the access controller 220.

In the above-described fourth embodiment, similarly to the second embodiment, the rebuild process and the salvage process are asynchronously executed. However, at a time point of failing in reading out data during the rebuild process, the salvage process illustrated in FIG. 26 may be executed.

Further, the salvage process illustrated in FIG. 26 may be executed when data is not successfully read out during host-reading.

Further, in the non-redundant write management table 270 used in the above-described second embodiment, location information is registered if a host write occurs during a time period after a HDD has failed and before a hot spare HDD where data is to be rebuilt is made ready for use. On the other hand, in the write management table 290 used in the fourth embodiment, location information is registered if a host write occurs during a time period after a HDD has failed and before the rebuild process is completed. Therefore, the non-redundant write management table 270 is more likely to make it possible to reduce the amount of data than the write management table 290. That is, the second embodiment makes it possible to reduce the capacity of a table for storing information on the occurrence of a host write, compared with the fourth embodiment.

According to the storage system, storage control apparatus, and storage control method, described above, it is possible to reduce the probability of losing data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
a plurality of storage devices;
a storage control apparatus configured to control recording of data in the plurality of storage devices such that the data recorded in the plurality of storage devices is made redundant between different storage devices; and
a spare storage device configured to be used in place of any of the plurality of storage devices,
wherein the storage control apparatus performs a procedure including:
executing access processing to access the data recorded in the plurality of storage devices in response to an access request from a host apparatus;
continuing the access processing, when a first storage device is in failure in the access processing, using remaining ones of the plurality of storage devices except the first storage device;
executing, upon failure of the first storage device, a rebuild process in the spare storage device to store the same data as data recorded in the first storage device;
writing data in the spare storage device, as part of the access processing, in response to each write request received from the host apparatus during the rebuild process;
determining, when the rebuild process fails to read data once from an address in a second storage device, whether the writing in the spare storage device has been performed at an address corresponding to the address of the failed reading;
considering the rebuild process as having been completed for the data that the rebuild process has failed to read once, when the determining finds that the writing in the spare storage device has been performed at the address corresponding to the address of the failed reading; and
reading data out from the first storage device at an address corresponding to the address of the failed reading, when the determining finds that the writing in the spare storage device has not been performed at the address corresponding to the address of the failed reading.

2. The storage system according to claim 1, wherein the procedure performed by the storage control apparatus further includes:
restarting the second storage device when the reading data out from the first storage device at the address corresponding to the address of the failed reading is unsuccessful, and reading again the data that the rebuild process has failed to read once, from the restarted second storage device.

3. The storage system according to claim 1, wherein the procedure performed by the storage control apparatus further includes:
writing data in the second storage device, as part of the access processing, in response to each write request received from the host apparatus;
further determining, the writing in the spare storage device has not been performed at the address corresponding to the address of the failed reading, whether the writing data in the second storage device has been performed at the address of the failed reading during a time period after the failure of the first storage device and before the spare storage device becomes available for the writing data to be performed as part of the access processing;
reading data out from the first storage device at an address corresponding to the address of the failed reading, when the further determining finds that the writing data in the second storage device has not been performed at the address of the failed reading; and
restarting the second storage device when the further determining finds that the writing data in the second storage device has been performed at the address of the failed reading, and reading again the data that the rebuild process has failed to read once, from the restarted second storage device.

4. The storage system according to claim 1, wherein:
all storage areas in the spare storage device are set to a state in which a data readout error occurs, before the rebuild process is executed in the spare storage device; and
the storage control apparatus performs the determining by:
reading data from the spare storage device at the address corresponding to the address of the failed reading,
determining that the address of the failed reading corresponds to one of addresses in the spare storage device at which the writing of data has been performed, when the reading data from the spare storage has been completed without causing data readout errors, and
determining that the writing in the spare storage device has not been performed at the address corresponding to the address of the failed reading, when the reading data from the spare storage has ended up with a data readout error.

5. The storage system according to claim 1,
wherein the procedure performed by the storage control apparatus further includes:
writing data in the second storage device, as part of the access processing, in response to each write request received from the host apparatus;
further determining, when the rebuild process fails to read data once from an address in the second storage device, whether the writing in the second storage device has performed at the address of the failed reading during a time period from the failure of the first storage device up to the present;

reading data out from the first storage device at an address corresponding to the address of the failed reading, when the further determining finds that the writing in the second storage device has not been performed at the address of the failed reading; and restarting the second storage device when the further determining finds that the writing data in the second storage device has been performed at the address of the failed reading, and reading again the data that the rebuild process has failed to read once, from the restarted second storage device.

6. The storage system according to claim 1, wherein the procedure performed by the storage control apparatus further includes:

reading data from the second storage device in response to a read request from the host apparatus received after the failure of the first storage device; and reading, when the reading in response to the read request has failed, data from the first storage device at an address associated with data requested by the read request.

7. A storage control apparatus that controls recording of data in a plurality of storage devices such that the data recorded in the plurality of storage devices is made redundant between different storage devices, the storage control apparatus comprising one or more processors configured to perform a procedure including:

executing access processing to access the data recorded in the plurality of storage devices in response to an access request from a host apparatus;

continuing the access processing, when a first storage device is in failure in the access processing, using remaining ones of the plurality of storage devices except the first storage device;

executing, upon failure of the first storage device, a rebuild process in a spare storage device to store the same data as data recorded in the first storage device;

writing data in the spare storage device, as part of the access processing, in response to each write request received from the host apparatus during the rebuild process;

determining, when the rebuild process fails to read data once from an address in a second storage device, whether the writing in the spare storage device has been performed at an address corresponding to the address of the failed reading;

considering the rebuild process as having been completed for the data that the rebuild process has failed to read once, when the determining finds that the writing in the spare storage device has been performed at the address corresponding to the address of the failed reading; and reading data out from the first storage device at an address corresponding to the address of the failed reading, when the determining finds that the writing in the spare storage device has not been performed at the address corresponding to the address of the failed reading.

8. The storage control apparatus according to claim 7, wherein the procedure further includes:

restarting the second storage device when the reading data out from the first storage device at the address corresponding to the address of the failed reading is unsuccessful, and reading again the data that the rebuild process has failed to read once, from the restarted second storage device.

9. A storage control method for a storage control apparatus that controls recording of data in a plurality of storage devices such that the data recorded in the plurality of storage devices is made redundant between different storage devices, the storage control method comprising:

executing access processing to access the data recorded in the plurality of storage devices in response to an access request from a host apparatus;

continuing the access processing, when a first storage device is in failure in the access processing, using remaining ones of the plurality of storage devices except the first storage device;

executing, upon failure of a first storage device in the plurality of storage devices, a rebuild process in a spare storage device to store the same data as data recorded in the first storage device;

writing data in the spare storage device, as part of the access processing, in response to each write request received from the host apparatus during the rebuild process;

determining, when the rebuild process fails to read data once from an address in a second storage device, whether the writing in the spare storage device has been performed at an address corresponding to the address of the failed reading;

considering the rebuild process as having been completed for the data that the rebuild process has failed to read once, when the determining finds that the writing in the spare storage device has been performed at the address corresponding to the address of the failed reading; and reading data out from the first storage device at an address corresponding to the address of the failed reading, when the determining finds that the writing in the spare storage device has not been performed at the address corresponding to the address of the failed reading.

10. The storage control method according to claim 9, further comprising:

restarting the second storage device when the reading data out from the first storage device at the address corresponding to the address of the failed reading is unsuccessful, and reading again the data that the rebuild process has failed to read once, from the restarted second storage device.

11. The storage control method according to claim 9, further comprising:

writing data in the second storage device, as part of the access processing, in response to each write request received from the host apparatus;

further determining, when the writing in the spare storage device has not been performed at the address corresponding to the address of the failed reading, whether the writing data in the second storage device has been performed at the address of the failed reading during a time period after the failure of the first storage device and before the spare storage device becomes available for the writing data to be performed as part of the access processing;

reading data out from the first storage device at an address corresponding to the address of the failed reading, when the further determining finds that the writing data in the second storage device has not been performed at the address of the failed reading; and restarting the second storage device when the further determining finds that the writing data in the second storage device has been performed at the address of the failed reading, and reading again the data that the rebuild process has failed to read once, from the restarted second storage device.

12. The storage control method according to claim 9, wherein:
    all storage areas in the spare storage device are set to a state in which a data readout error occurs, before the rebuild process is executed in the spare storage device; and
    the storage control method performs the determining by:
        reading data from the spare storage device at the address corresponding to the address of the failed reading,
        determining that the address of the failed reading corresponds to one of addresses in the spare storage device at which the writing of data has been performed, when the reading data from the spare storage has been completed without causing data readout errors, and
        determining that the writing in the spare storage device has not been performed at the address corresponding to the address of the failed reading, when the reading data from the spare storage has ended up with a data readout error.

13. The storage control method according to claim 9, further comprising:
    writing data in the second storage device, as part of the access processing, in response to each write request received from the host apparatus;
    further determining, when the rebuild process fails to read data once from an address in the second storage device, whether the writing in the second storage device has performed at the address of the failed reading during a time period from the failure of the first storage device up to the present;
    reading data out from the first storage device at an address corresponding to the address of the failed reading, when the further determining finds that the writing in the second storage device has not been performed at the address of the failed reading; and
    restarting the second storage device when the further determining finds that the writing data in the second storage device has been performed at the address of the failed reading, and reading again the data that the rebuild process has failed to read once, from the restarted second storage device.

14. The storage control method according to claim 9, further comprising:
    reading data from the second storage device in response to a read request from the host apparatus received after the failure of the first storage device; and
    reading, when the reading in response to the read request has failed, data from the first storage device at an address associated with data requested by the read request.

* * * * *